United States Patent
Nagatani

(10) Patent No.: US 12,058,164 B2
(45) Date of Patent: Aug. 6, 2024

(54) ANALYSIS SYSTEM, METHOD, AND PROGRAM

(71) Applicant: NEC Corporation, Tokyo (JP)

(72) Inventor: Noboru Nagatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 357 days.

(21) Appl. No.: 17/439,999

(22) PCT Filed: Feb. 7, 2020

(86) PCT No.: PCT/JP2020/004815
§ 371 (c)(1),
(2) Date: Sep. 16, 2021

(87) PCT Pub. No.: WO2020/195229
PCT Pub. Date: Oct. 1, 2020

(65) Prior Publication Data
US 2022/0174087 A1    Jun. 2, 2022

(30) Foreign Application Priority Data

Mar. 28, 2019  (JP) .................................. 2019-063598

(51) Int. Cl.
*H04L 29/00*     (2006.01)
*H04L 9/40*      (2022.01)
*H04L 45/02*     (2022.01)

(52) U.S. Cl.
CPC .......... *H04L 63/1433* (2013.01); *H04L 45/02* (2013.01); *H04L 63/1416* (2013.01); *H04L 63/145* (2013.01)

(58) Field of Classification Search
CPC . H04L 63/1433; H04L 45/02; H04L 63/1416; H04L 63/145; H04L 63/1408; G06F 21/57
See application file for complete search history.

(56) References Cited

U.S. PATENT DOCUMENTS 8,125,898 B1 * 2/2012 Strayer .............. H04L 63/1416
                                                    709/224
8,881,288 B1 * 11/2014 Levy ..................... G06F 21/577
                                                    709/225
(Continued)

FOREIGN PATENT DOCUMENTS

CN    101075917 A  * 11/2007 ............. G06F 21/55
JP    2003-108521 A     4/2003
(Continued)

OTHER PUBLICATIONS

International Search Report for PCT Application No. PCT/JP2020/004815, mailed on Apr. 14, 2020.
(Continued)

*Primary Examiner* — Don G Zhao
(74) *Attorney, Agent, or Firm* — Sughrue Mion, PLLC

(57) ABSTRACT

The topology identification unit 4 identifies a network topology of devices included in a system to be diagnosed. The detection unit 5 detects attack routes that indicate flows of attacks that can be executed in the system to be diagnosed, based on security information about each device. The time information identification unit 7 identifies time information that represents degree of time required to attack a device, for each device on each attack route. The display control unit 8 displays the attack routes on a display device by superimposing the attack routes on the network topology. At this time, the display control unit 8 displays each attack route on the display device in a manner that allows a user to recognize degree of spread of attack along each attack route, based on the time information identified for each device on each attack route.

7 Claims, 17 Drawing Sheets

(56) References Cited

U.S. PATENT DOCUMENTS

| | | | |
|---|---|---|---|
| 9,049,226 B1* | 6/2015 | Duane | H04L 63/1416 |
| 9,100,430 B1* | 8/2015 | Seiver | H04L 63/101 |
| 9,118,711 B2* | 8/2015 | Oliphant | H04L 63/02 |
| 10,313,211 B1* | 6/2019 | Rastogi | H04L 41/142 |
| 10,931,686 B1* | 2/2021 | Mehta | H04L 63/1416 |
| 11,050,784 B1* | 6/2021 | Mattison | H04L 63/108 |
| 2005/0044390 A1* | 2/2005 | Trostle | G06F 21/83 |
| | | | 713/188 |
| 2005/0289649 A1 | 12/2005 | Mitomo et al. | |
| 2006/0020796 A1* | 1/2006 | Aura | H04L 9/3236 |
| | | | 713/168 |
| 2008/0046393 A1* | 2/2008 | Jajodia | H04L 41/22 |
| | | | 706/50 |
| 2009/0293128 A1* | 11/2009 | Lippmann | H04L 63/1433 |
| | | | 707/999.1 |
| 2011/0085681 A1* | 4/2011 | Hashimoto | H03G 7/002 |
| | | | 381/107 |
| 2012/0023572 A1* | 1/2012 | Williams, Jr. | H04L 63/1425 |
| | | | 726/13 |
| 2015/0281101 A1* | 10/2015 | Mosko | H04L 67/5682 |
| | | | 370/235 |
| 2015/0326460 A1* | 11/2015 | Wang | H04L 43/026 |
| | | | 370/252 |
| 2016/0191532 A1* | 6/2016 | Seiver | H04L 63/1433 |
| | | | 726/4 |
| 2017/0032130 A1* | 2/2017 | Joseph Durairaj | |
| | | | H04L 63/1416 |
| 2017/0046519 A1* | 2/2017 | Cam | G06N 7/01 |
| 2017/0078322 A1* | 3/2017 | Seiver | H04L 63/1416 |
| 2017/0093910 A1* | 3/2017 | Gukal | H04L 63/1491 |
| 2017/0223046 A1* | 8/2017 | Singh | H04L 63/1491 |
| 2017/0244745 A1* | 8/2017 | Key | H04L 63/1425 |
| 2018/0337939 A1 | 11/2018 | Agarwal | |
| 2018/0375885 A1* | 12/2018 | Chen | G06N 5/01 |
| 2019/0068631 A1* | 2/2019 | Ashkenazy | H04L 41/22 |
| 2019/0081974 A1* | 3/2019 | Lasser | H04L 63/1433 |
| 2020/0153857 A1* | 5/2020 | Chou | H04L 63/1458 |
| 2022/0038472 A1* | 2/2022 | Nishioka | H04L 63/1425 |
| 2023/0034910 A1* | 2/2023 | Engelberg | H04L 63/1416 |

FOREIGN PATENT DOCUMENTS

| | | |
|---|---|---|
| JP | 2005-341217 A | 12/2005 |
| JP | 2008-257577 A | 10/2008 |
| JP | 2015-216549 A | 12/2015 |
| JP | 2016-218695 A | 12/2016 |
| WO | 2019/003373 A1 | 1/2019 |

OTHER PUBLICATIONS

English translation of Written opinion for PCT Application No. PCT/JP2020/004815, mailed on Apr. 14, 2020.
Yoshiki Kusama et al., "A Study of Security Problem on Telecommunications Networks", IEICE Technical Report, Aug. 31, 2008, vol. 118, No. 212, pp. 1-5, ISSN 0913-5685.

* cited by examiner

FIG. 4

| VULNERABILITY | DEVICE | AUTHENTI-CATION | NUMBER OF CHARACTERS IN PASSWORD | LOCKOUT PERIOD | AUTHENTI-CATION INTERVAL | PRESENCE OF ATTACK TOOLS | ACCESS VECTOR | ACCESS COMPLEXITY | TIME INFORMATION |
|---|---|---|---|---|---|---|---|---|---|
| CVE-2017-9*99 | SERVER | SINGLE | 9 | 60 MINUTES | 10 SECONDS | NOT PRESENT | LOCAL | HIGH | 20 |
| CVE-2017-9*99 | SERVER | SINGLE | 8 | 20 MINUTES | 5 SECONDS | NOT PRESENT | LOCAL | HIGH | 17 |
| CVE-2017-9*99 | SERVER | SINGLE | 6 | 0 SECONDS | 0 SECONDS | NOT PRESENT | LOCAL | HIGH | 15 |
| ·· | ·· | SINGLE | — | — | ·· | NOT PRESENT | LOCAL | HIGH | ·· |
| CVE-2016-8*88 | ROUTER | UN-NECESSARY | — | — | — | PRESENT | NETWORK | LOW | 5 |
| ABUSE OF FTP | — | — | — | — | — | — | — | — | 10 |
| ABUSE OF Telnet | — | — | — | — | — | — | — | — | 10 |
| ·· | ·· | ·· | ·· | ·· | ·· | ·· | ·· | ·· | ·· |

| SOFTWARE NAME | VULNERABILITY |
|---|---|
| SOFTWARE A | CVE-2017-9*99 |
| SOFTWARE B | CVE-2016-8*88 |
| SOFTWARE C | ABUSE OF FTP |
| SOFTWARE D | ABUSE OF Telnet |
| : | : |

[AFTER 5 SECONDS HAVE ELAPSED]

[AFTER 15 SECONDS HAVE ELAPSED]

[AFTER 5 SECONDS HAVE ELAPSED]

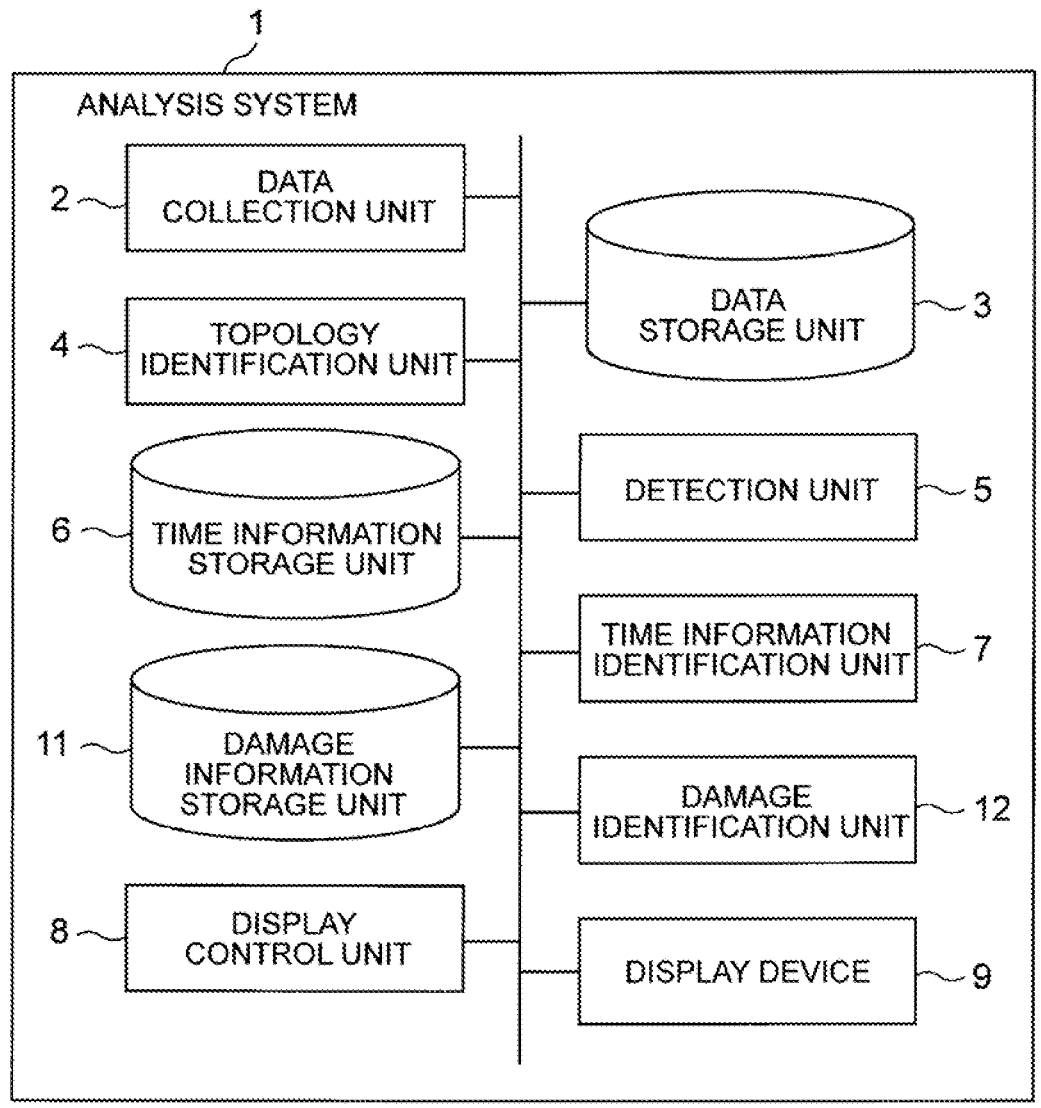

ANALYSIS SYSTEM, METHOD, AND PROGRAM

This application is a National Stage Entry of PCT/JP2020/004815 filed on Feb. 7, 2020, which claims priority from Japanese Patent Application 2019-063598 filed on Mar. 28, 2019, the contents of all of which are incorporated herein by reference, in their entirety.

TECHNICAL FIELD

The present invention relates to an analysis system, an analysis method, and an analysis program that display information that can be used as a basis for making decisions about how to deal with an attack on a system to be diagnosed.

BACKGROUND ART

It is required for, information processing systems that include the plurality of computers, to take security measures to protect information assets from cyber attacks. The security measures include assessing the vulnerability and the like of the target system and removing vulnerabilities as necessary.

PLT 1 describes artificially assessing, by a simulator, vulnerability testing on a system consisting of computers connected to a network.

Also, PLT 1 describes assessing vulnerability propagation based on client/server reliability.

CITATION LIST

Patent Literature

PLT 2: Japanese Patent Application Laid-Open No. 2003-108521

SUMMARY OF INVENTION

Technical Problem

The system that is the target of the security diagnosis is referred to as the system to be diagnosed. An attack route indicates a flow of an attack that can be executed in the system to be diagnosed.

It is common to assess the impact of each vulnerability in order to take security-related measures.

However, since the configuration of each system to be diagnosed is different, it is difficult to grasp the impact of an attack on the system to be diagnosed only by assessing the impact of the vulnerability.

In particular, when the plurality of attack routes exist, it is difficult for a security administrator to understand the spread of the attacks and to grasp the areas that need to be addressed.

Therefore, the object of the present invention is to provide an analysis system, analysis method, and analysis program that can analyze how the impact of an attack spreads.

Solution to Problem

An analysis system according to the present invention comprises a topology identification unit that identifies a network topology of devices included in a system to be diagnosed; a detection unit that detects attack routes that indicate flows of attacks that can be executed in the system to be diagnosed, based on security information about each device; a time information identification unit that identifies time information that represents degree of time required to attack a device, for each device on each attack route; and, a display control unit that displays the attack routes on a display device by superimposing the attack routes on the network topology, wherein the display control unit displays each attack route on the display device in a manner that allows a user to recognize degree of spread of attack along each attack route, based on the time information identified for each device on each attack route.

An analysis method according to the present invention is implemented by a computer, and comprises identifying a network topology of devices included in a system to be diagnosed; detecting attack routes that indicate flows of attacks that can be executed in the system to be diagnosed, based on security information about each device; identifying time information that represents degree of time required to attack a device, for each device on each attack route; and, displaying the attack routes on a display device by superimposing the attack routes on the network topology, wherein when displaying the attack routes on a display device the computer displays each attack route on the display device in a manner that allows a user to recognize degree of spread of attack along each attack route, based on the time information identified for each device on each attack route.

An analysis program according to the present invention causes a computer to execute: a topology identification process of identifying a network topology of devices included in a system to be diagnosed; a detection process of detecting attack routes that indicate flows of attacks that can be executed in the system to be diagnosed, based on security information about each device; a time information identification process of identifying time information that represents degree of time required to attack a device, for each device on each attack route; and, a display control process of displaying the attack routes on a display device by superimposing the attack routes on the network topology, wherein the analysis program causes the computer to execute, in the display control process, displaying control unit displays each attack route on the display device in a manner that allows a user to recognize degree of spread of attack along each attack route, based on the time information identified for each device on each attack route. The present invention may also be a computer-readable recording medium in which the analysis program described above is recorded.

Advantageous Effects of Invention

According to the present invention, it is possible to analyze how the impact of an attack spreads.

BRIEF DESCRIPTION OF DRAWING

FIG. 4 It is a schematic diagram depicting an example of a table that stores predetermined time information according to the type of vulnerability, or the type of vulnerability, device and device settings.

FIG. 15 It is a block diagram of an example of the analysis system of the second example embodiment of the present invention.

FIG. 16 It is a schematic diagram depicting an example of information stored in the damage information storage unit.

DESCRIPTION OF EMBODIMENTS

Example embodiments of the present invention will be described below, with reference to the drawings.

Example Embodiment 1

Figure 1:
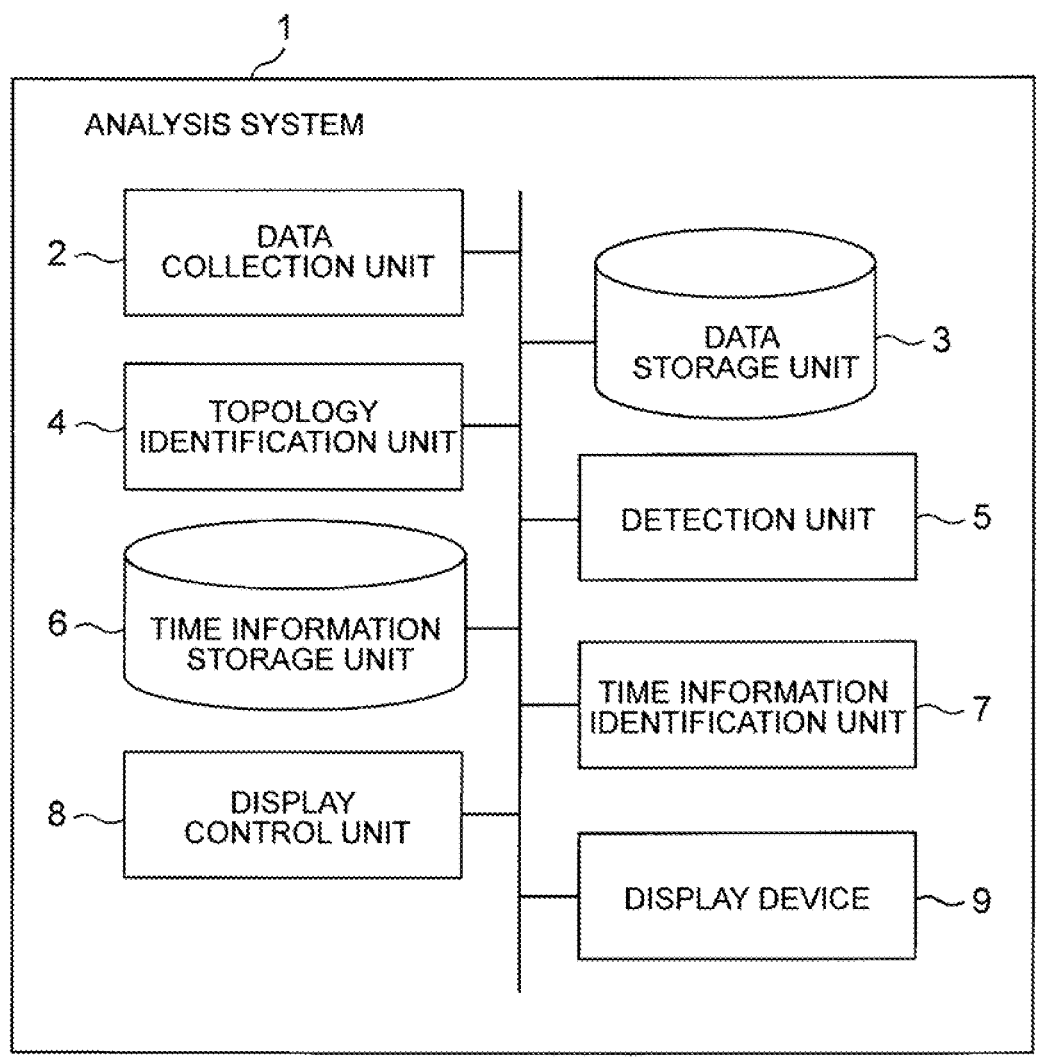
FIG. 1 It is a block diagram of an example of the analysis system of the first example embodiment of the present invention.

FIG. 1 is a block diagram of an example of the analysis system of the first example embodiment of the present invention. The analysis system 1 of the first example embodiment includes a data collection unit 2, a data storage unit 3, a topology identification unit 4, a detection unit 5, a time information storage unit 6, a time information identification unit 7, a display control unit 8, and a display device 9.

It is assumed that the analysis system in each of the example embodiments of the present invention virtualizes the system to be diagnosed and performs simulations based on the information of each device and other information to analyze the system to be diagnosed.

The data collection unit 2 collects information on each device included in the system to be diagnosed (the system that is the target of the security diagnosis).

Examples of systems to be diagnosed include, for example, IT (Information Technology) systems in companies and so-called OT (Operational Technology) systems for controlling factories and plants and the like. However, the systems to be diagnosed are not limited to these systems. A system in which the plurality of devices are connected via a communication network can be a system to be diagnosed.

Each device included in the system to be diagnosed is connected via a communication network. Examples of devices included in the system to be diagnosed include personal computers, servers, switches, routers, machine tools installed in factories, and control devices for machine tools. However, devices are not limited to the above examples. The devices may be physical devices or virtual devices.

Examples of information collected by the data collection unit 2 include, for example, information on the operating system (OS) installed in the device and its version, information on the hardware configuration installed in the device, information on the software installed in the device and its version, information on the communication data exchanged between the device and other devices and the communication protocol used to exchange the communication data, and information on the status of the ports of the device (which ports are open) and the like. The communication data includes information on the source and destination of the communication data.

The data collection unit 2 further collects information related to spread of attack as information about the device. An example of information related to the spread of an attack is information about a brute force password attack. This information includes whether or not a lockout is set during authentication, the lockout period if a lockout is set, whether or not an authentication interval is set during authentication, the authentication interval if an authentication interval is set, and the password policy.

The lockout setting is a setting that rejects the acceptance of account information for a certain period of time if the authentication fails for a predetermined number of times. This certain period of time is referred to as the lockout period. An example of a lockout period is a period of several minutes to about an hour.

The authentication interval setting is a setting that does not accept account information until a certain period of time has passed after a single authentication failure. This certain period of time is referred to as the authentication interval. An example of an authentication interval is a period of about 10 seconds.

A password policy is information that defines the rules for passwords used during authentication. An example of a password policy is the number of characters in a password. However, the password policy is not limited to the number of characters, and other rules may be specified in addition to the number of characters in the password.

The examples of information collected by the data collection unit 2 are not limited to the above examples, and the data collection unit 2 may also collect other information as information about the device.

The data collection unit 2 may collect information about the devices directly from each device included in the system to be diagnosed. In this case, the analysis system 1 is connected to each device via a communication network, and the data collection unit 2 may collect information from each device via the communication network.

Alternatively, the data collection unit 2 may obtain information about each device from an information collection server that collects information about each device. In this case, the analysis system 1 is connected to the information collection server via a communication network, and the data collection unit 2 may collect information about each device from the information collection server via the communication network.

If each device is equipped with an agent, the data collection unit 2 may collect information about each device via the agent, or it may obtain information about each device from an information collection server that has collected information about each device via the agent.

An agent installed in each device may respectively transmit information about the device to an information collection server, and the data collection unit 2 may collect information about each device included in the system to be diagnosed from the information collection server. In this case, for example, the analysis system 1 is connected to the information collection server via a communication network, and the data collection unit 2 may collect information about each device from that information collection server via the communication network.

When the data collection unit 2 collects information about each device included in the system to be diagnosed, it stores the information in the data storage unit 3.

The data storage unit 3 is a storage device that stores the information about each device collected by the data collection unit 2.

Figure 2:
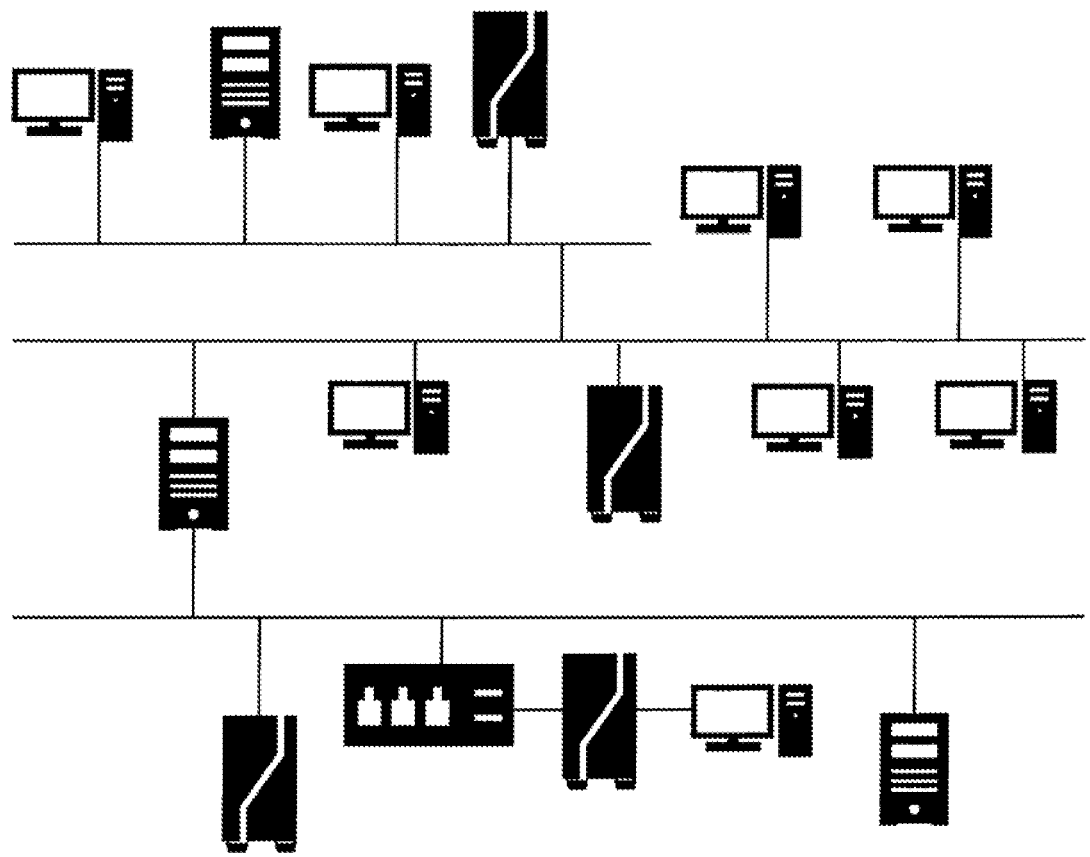
FIG. 2 It is a schematic diagram depicting an example of a network topology identified by the topology identification unit.

The topology identification unit 4 identifies the network topology of each device. Specifically, the topology identification unit 4 may identify the network topology of each device based on the network topology configuration given by the security administrator (hereinafter referred to simply as the administrator), or it may identify the network topology of each device based on the information about each device stored in the data storage unit 3. FIG. 2 is a schematic diagram depicting an example of a network topology identified by the topology identification unit 4. FIG. 2 indicates a situation in which the plurality of devices are connected via a communication network.

The detection unit 5 detects the attack routes in the system to be diagnosed based on the security information about each device stored in the data storage unit 3. Specifically, the security information about the devices includes the security support status of the devices.

The attack route indicates the flow of an attack that can be executed in the system to be diagnosed. Specifically, the attack route is a route that indicates the order of the devices to be attacked, from the device that is the starting point of the attack to the device that is the end point of the attack.

The detection unit 5 may detect the attack route based on the security information about each device and the predefined analysis rules.

For example, the detection unit 5 may detect the attack route using the following method.

First of all, there are the plurality of types of attacks, and the attacks that a device may be subjected to vary depending on the vulnerabilities it has. Therefore, in each example embodiment of the present invention, the state of a device that may be attacked due to vulnerability is defined as an attack state. For example, an attack state can be defined as "a state in which code can be executed (hereinafter referred to as "execCode")", "a state in which data can be tampered with (hereinafter referred to as "dataInject")", "a state in which files can be accessed (hereinafter referred to as "accessFile")", "a state in which account information is held (hereinafter referred to as "hasAccount")", "a state in which DoS (Denial of Service) attacks can be performed", etc.

Figure 3:
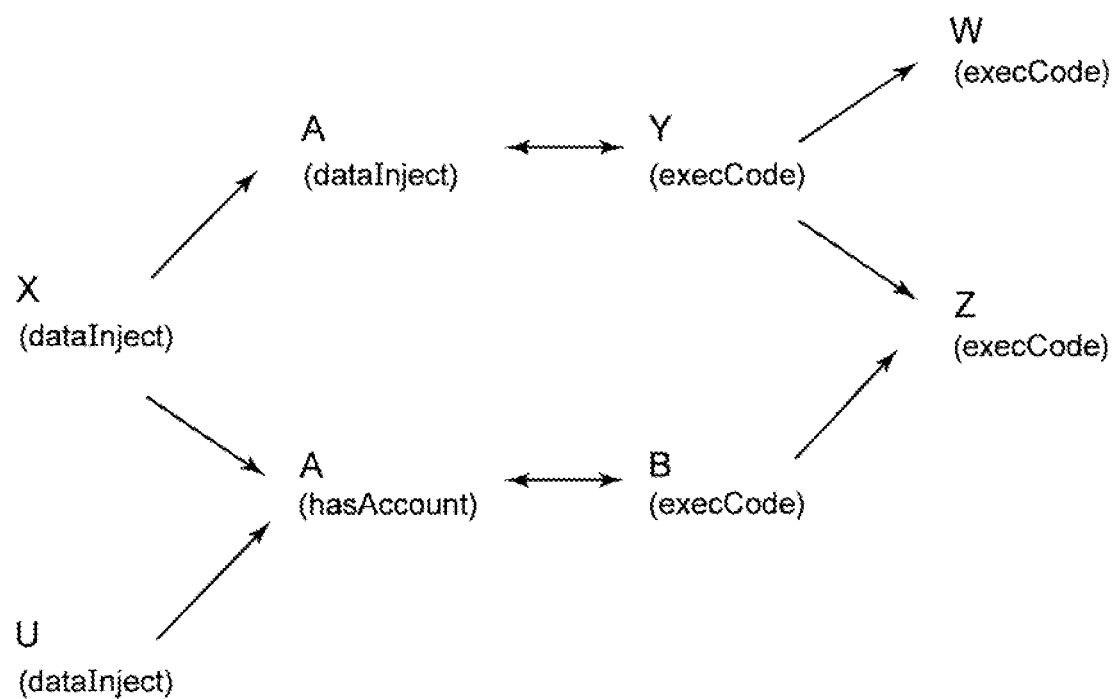
FIG. 3 It is a schematic diagram depicting an example of information showing the plurality of transition relationships of a "combination of device and attack state".

The information that indicates the transition from one "combination of device and attack state" to another "combination of device and attack state" is called an attack scenario. The transition from one "combination of device and attack state" to another "combination of device and attack state" indicates that one attack becomes possible on one device, and another attack becomes possible on that device or another device. The detection unit 5 detects possible attack scenarios in the system to be diagnosed, based on the security information for each device and the predefined analysis rules. Specifically, the detection unit 5 detects attack scenarios according to whether the security information for each device matches the conditions indicated by the analysis rules. The detection unit 5 considers the "combination of devices and attack states" as a node in the plurality of detected attack scenarios, and obtains information indicating the plurality of transition relationships of the "combination of devices and attack states" by connecting the common node. FIG. 3 is a schematic diagram depicting an example of this information. In FIG. 3, "A", "B", "U", "W",. "X", "Y", and "Z" represent devices, respectively. Here, the case, where the information shown in FIG. 3 is obtained, will be explained as an example.

The detection unit 5 accepts the designation of the analysis target from the administrator via the user interface (not shown). The analysis target may be a device that is the starting point of an attack, a device that is the end point of an attack, or a combination of the two. Also, the plurality of analysis targets may be designated. The detection unit 5 detects the attack route based on the information (see FIG. 3) that indicates the plurality of transition relationships of "combination of device and attack state" for the analysis target specified by the administrator.

For example, if the administrator designates a device X as the starting point of the attack and a device Z as the end point of the attack, the detection unit 5 can detect the attack route "X→A→Y→Z" (hereinafter referred to as attack route 1), and the attack route "X→A→B→Z" (hereinafter referred to as attack route 2) based on the information schematically shown in FIG. 3. In this way, even if one starting point and one ending point are designated, the plurality of attack routes may exist.

For example, if the administrator designates a device X as the starting point of the attack and a device W as the end point of the attack, the detection unit 5 can detect the attack route "X→A→Y→W" based on the information schematically shown in FIG. 3.

This method is an example of how the detection unit 5 detects attack routes.

In the above method, even if there are common devices on different attack routes, the attack states of the devices are not necessarily identical. Since a device may have the plurality of vulnerabilities, or a single vulnerability may result in the plurality of attacks, the attack state of the common devices on different attack routes may be different. For example, in the above attack route 1, the attack state of device A is "dataInject", and in the above attack route 2, the attack state of device A is "hasAccount" (see FIG. 3).

In addition, the attack route is not always detected for the analysis target designated by the administrator. For example, if an administrator designates a device Z as the starting point of an attack and a device X as the end point of an attack, no attack route will be detected (see FIG. 3). This means that there is no attack from device Z to device X.

When the administrator designates only the starting point, the detection unit 5 may set the important device described below as the end point. When the administrator designates only the endpoint, the detection unit 5 may set a predetermined terminal that has a high possibility of being the starting point as the starting point.

By referring to the information collected from the devices and the information stored in the time information storage unit 6, the time information identifying unit 7 identifies the time information that represents the degree of time required to attack the devices, for each device on each attack route. The operation of the time information identification unit 7 to identify the time information for each device is described below.

The time information may be the time required to attack a device itself. The time required to attack a device may be an approximate value. The time information may also be information representing, relatively, the time required to attack the device. The information representing, relatively, the time required to attack the device may be labeled as "long time," "medium time," "short time," etc. In the following explanation, the case, where a numerical value representing the time required to attack a device is used as the time information, will be explained.

It can be said that the time information also represents the degree of speed of the attack.

The time information storage unit 6 is a storage device that stores information used by the time information identification unit 7 to identify the time information for each device.

The time information storage unit 6 stores time information defined according to the type of vulnerability, or the type of vulnerability, device and device settings (in the example shown below, the settings related to authentication), for example, in the table format illustrated in FIG. 4.

There are two main types of security vulnerabilities. The first is vulnerabilities caused by software or device (routers, etc.) defects. Information on these vulnerabilities is collected and classified by various organizations, and the vulnerabilities are numbered accordingly. As an example, in the Common Vulnerabilities and Exposures (CVE), an identifier of the form "CVE-**-**" is assigned to the discovered vulnerability. The second type of vulnerability is the vulnerability caused by the protocol specification. Examples of such vulnerabilities are "abuse of FTP (File Transfer Protocol)", "abuse of Telnet", etc. In each example embodiment of the present invention, the vulnerabilities include these first and second vulnerabilities.

FIG. 4 is a schematic diagram depicting an example of a table that stores predetermined time information according to the type of vulnerability, or the type of vulnerability, device and device settings. The time information storage unit 6 stores the table illustrated in FIG. 4. As mentioned above, the case where a numerical value representing the time required to attack a device is used as the time information is taken as an example.

In the example shown in FIG. 4, "Authentication (Authentication required before attack)", "Presence of attack tools", "Access Vector", and "Access Complexity" are predetermined for software and device vulnerabilities. The "Authentication", "Access Vector", and "Access Complexity" can be determined from the evaluation conducted by the CVSS v3 (Common Vulnerability Scoring System v3) for each vulnerability. In other words, by referring to the results of the CVSS v3 assessment for each vulnerability, the administrator can know the "Authentication", "Access Vector", and "Access Complexity".

There are three categories of "Authentication": "multiple (more than one authentication is required before attack)," "single (authentication is required before attack)," and "unnecessary (authentication is not required before attack).

An attack tool is a tool that is used to attack vulnerabilities. An example of an attack tool is a hacking tool such as an exploit kit distributed on the dark web.

The "Access Vector" indicates "from where the attack is possible. For example, if the "Access Vector" is "local", it means that the attack must be done from a local environment, such as via USB (Universal Serial Bus). For example, if the "Access Vector" is "network", it means that an attack from a remote location is possible.

The "Access Complexity" is the complexity of the attack conditions and is divided into three categories: "high," "medium," and "low.

The administrator predetermines the time information (the degree of time required to attack the vulnerability) of the software or device vulnerability according to the "device", "Authentication", "Presence of attack tools", "Access Vector", and "Access Complexity". For example, in "CVE-2016-8*88" illustrated in FIG. 4, the "device" is "router", the "Authentication" is "unnecessary", the attack tool exists, the "Access Vector" is "network", and the "Access Complexity" is "low". Based on these factors, the administrator can predetermine the time information for "CVE-2016-8*88."

Furthermore, for vulnerabilities where the "Authentication" is "single" or "multiple", the time information is determined by the administrator according to the combination of various settings related to authentication predetermined by the administrator, such as the "number of characters in password", "lockout period" and "authentication interval". For example, in the example shown in FIG. 4, for "CVE-2017-9*99", the "device" is "server", the "Authentication" is "single", there is no attack tool, the "Access Vector" is "local", and the "Access Complexity" is "high". However, the settings related to authentication (in this example, the number of characters in the password, lockout period, and authentication interval) vary depending on the settings of each device. Therefore, for "CVE-2017-9*99", the administrator shall determine various combinations of the number of characters in the password, lockout period, and authentication interval to be set for each device. Then, in addition to the fact that the "device" is "server", the "Authentication" is "single", there is no attack tool, the "Access Vector" is "local", and the "Access Complexity" is "high," the administrator also considers the plurality of settings related to authentication for each device, and may predetermine the time information according to the combination of settings for authentication. Therefore, in the table illustrated in FIG. 4, there are the plurality of records for "CVE-2017-9*99" according to the plurality of settings for devices and authentication.

Here, if authentication is required at the time of attack, the attacker will conduct a time-consuming attack such as a brute force attack. Therefore, the administrator may increase the value of the time information when authentication is required during an attack, and decrease the value of the time information when authentication is not required.

Also, the more characters in the password, the more time the attacker needs to attack. Therefore, the administrator may increase the value of the time information as the number of characters in the password increases, and decrease the value of the time information as the number of characters in the password decreases.

Also, the longer the lockout period, the more time the attacker needs to attack.

Therefore, the administrator may increase the value of the time information the longer the lockout period is, and decrease the value of the time information the shorter the lockout period is. The same applies to the authentication interval. The fact that the lockout period is 0 seconds means that no lockout has been set. Similarly, an authentication interval of 0 seconds means that no authentication interval has been set.

Also, when an attack tool is present, it becomes easier for an attacker to attack. Therefore, the administrator may decrease the value of the time information when the attack tool is present, and increase the value of the time information when the attack tool is not present.

Also, when the "Access Vector" is "local", it is harder for an attacker to attack. Therefore, the administrator may increase the value of the time information when the "Access Vector" is "local" and decrease the value of the time information when the "Access Vector" is not "local".

The administrator may also increase the value of the time information if the "Access Complexity" is "high", set the value of the time information to medium if the "Access Complexity" is "medium", and decrease the value of the time information if the "Access Complexity" is "low".

In the example shown in FIG. 4, the administrator sets the time information for vulnerabilities caused by the protocol specification. For example, in the example shown in FIG. 4, "10" is set as the time information for "abuse of FTP" and "abuse of Telnet", respectively. However, the time information for vulnerabilities caused by protocol specifications is not limited to the above example.

As described above, the administrator determines the time information for the vulnerability in advance, and stores a table (e.g., the table illustrated in FIG. 4) indicating the correspondence between the type of vulnerability, or the type of vulnerability, the device and device settings (settings related to authentication), and the time information, in the time information storage unit 6.

Figures 5, 6:
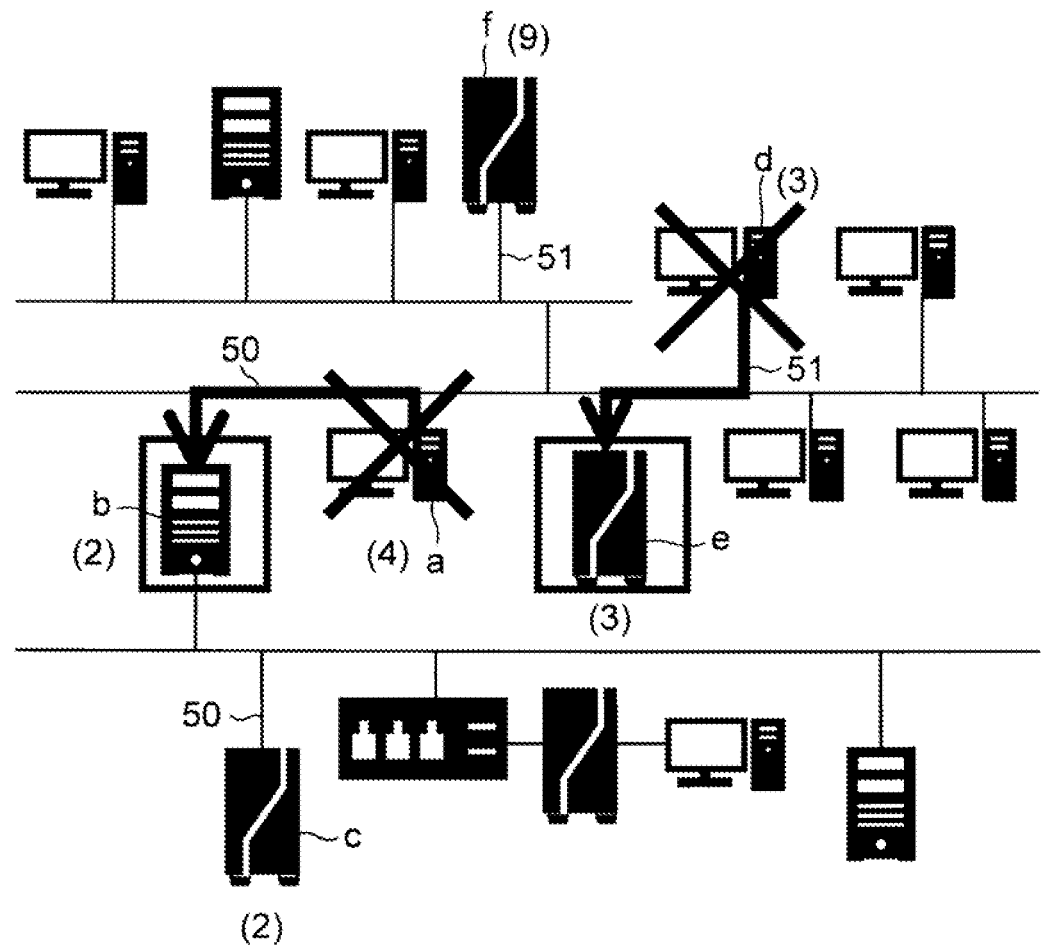
FIG. 5 It is a schematic diagram depicting an example of information indicating the correspondence between software and vulnerabilities.
FIG. 6 It is a schematic diagram indicating an example of how the display changes with the passage of time.

The correspondence relationship between various software and various vulnerabilities is predetermined. The administrator also stores the information indicating the correspondence between the software and the vulnerabilities in the time information storage unit 6 in advance. FIG. 5 is a schematic diagram depicting an example of information indicating the correspondence between software and vulnerabilities. The administrator may, for example, store the information indicating the correspondence between the software and the vulnerability in the time information storage unit 6 in the form of the table illustrated in FIG. 5. The table shown in FIG. 5 is hereinafter referred to as the correspondence table.

Each device may be equipped with the plurality of software, and each software may have the plurality of vulnerabilities. When a new vulnerability is discovered, the administrator may update the correspondence table illustrated in FIG. 5 or the table illustrated in FIG. 4.

The time information identification unit 7 identifies the time information for each device on each attack route. How the time information identification unit 7 identifies the time information of a single device on a single attack route is described below.

The time information identification unit 7 determines each vulnerability corresponding to each software installed in the device of interest, by referring to the information collected from the device of interest, checking each software installed in the device, and referring to the correspondence table (see FIG. 5) stored in the time information storage unit 6. Furthermore, the time information identification unit 7 identifies the vulnerability according to the attack route from among the determined vulnerabilities. As already explained, even if there are common devices on different attack routes, the attack states of the devices are not necessarily the identical. Therefore, as described above, the time information identification unit 7 identifies the vulnerability according to the attack route with respect to the device of interest.

Next, the time information identification unit 7 matches the above vulnerability that is identified, the device of interest, the collected information of the device of interest (lockout setting, lockout period if lockout is set, authentication interval setting during authentication, authentication interval if authentication interval is set, password policy) with the table shown in FIG. 4 stored in the time information storage unit 6. The time information corresponding to the vulnerability, the device of interest, and the information collected from the device of interest is read from the table shown in FIG. 4. The password policy specifies the number of characters in the password. If the time information can be identified only from the vulnerability, the time information identification unit 7 does not need to refer to the information collected from the device of interest.

As described above, the time information identification unit 7 identifies the time information of a single device on a single attack route. By performing this operation for each device on each attack route, the time information identification unit 7 identifies the time information of each device on each attack route.

The display control unit 8 displays each attack route on the display device 9, superimposed on the network topology identified by the topology identification unit 4. At this time, the display control unit 8 displays each attack route on the display device 9 in such a way that the administrator can recognize the degree of spread of the attack along each attack route, such as how the attack progresses over time and how soon the attack reaches the end device, based on the time information identified for each device along each attack route. An example of this display will be explained below.

In the following explanation, the case, where the display control unit 8 changes the information on the display device 9 indicating how far the attack along each attack route has progressed over time, based on the time information identified for each device on each attack route, will be explained as an example. Here, the case, where two attack routes are displayed, is used as an example.

In the following examples, for the sake of simplicity, it is assumed that one second in the time elapsed when each attack route is displayed corresponds to the value "1" in the time information.

First, the case where the display control unit 8 highlights the device under attack is explained. Using an attack along one attack route as an example, the operation of the display control unit 8 to show the degree of spread on the display device 9 will also be explained. After the display starts, the display control unit 8 highlights the first device of the attack route as long as the first device of the route is under attack (i.e., until the time corresponding to the time information of the first device has elapsed). An example of highlighting a device is to display it with a frame around it, or to display it by blinking. The following is an example of highlighting a device by enclosing it with a frame. When the time corresponding to the time information of the first device has elapsed, the display control unit 8 displays an arrow extending from the first device to the second device on the attack route, and highlights the second device to indicate that the second device is under attack. At this time, the display control unit 8 changes the display of the first device to indicate that it has been attacked and the attack was successful. This display may be different from the display of the device showing its normal state or the display of the device showing that it is under attack. The following explanation uses an example of a display in which an X mark is superimposed on the device as an indication that an attack on the device has been successful, but the example is not limited to this display. Thereafter, the display control unit 8 will sequentially highlight the devices that are under attack.

In other words, to indicate that the i-th device (i is an integer greater than or equal to 1) on the attack route is under attack, the display control unit 8 highlights the i-th device for a time corresponding to the time information of the i-th device. After the time corresponding to the time information of the i-th device has elapsed, an arrow extending from the i-th device to the i+1st device is displayed, and the display of the i-th device is used to indicate that the attack was successful. Then, the i+1st device is highlighted for a period of time corresponding to the time information of that i+1st device. The display control unit 8 repeats this operation until the display of the endpoint device is changed to indicate that the attack was successful.

The display control unit 8 displays the information in the same way for each of the attack routes.

In addition, the display control unit 8 will display the attack against the first device of each attack route as if it starts simultaneously.

Figure 7:
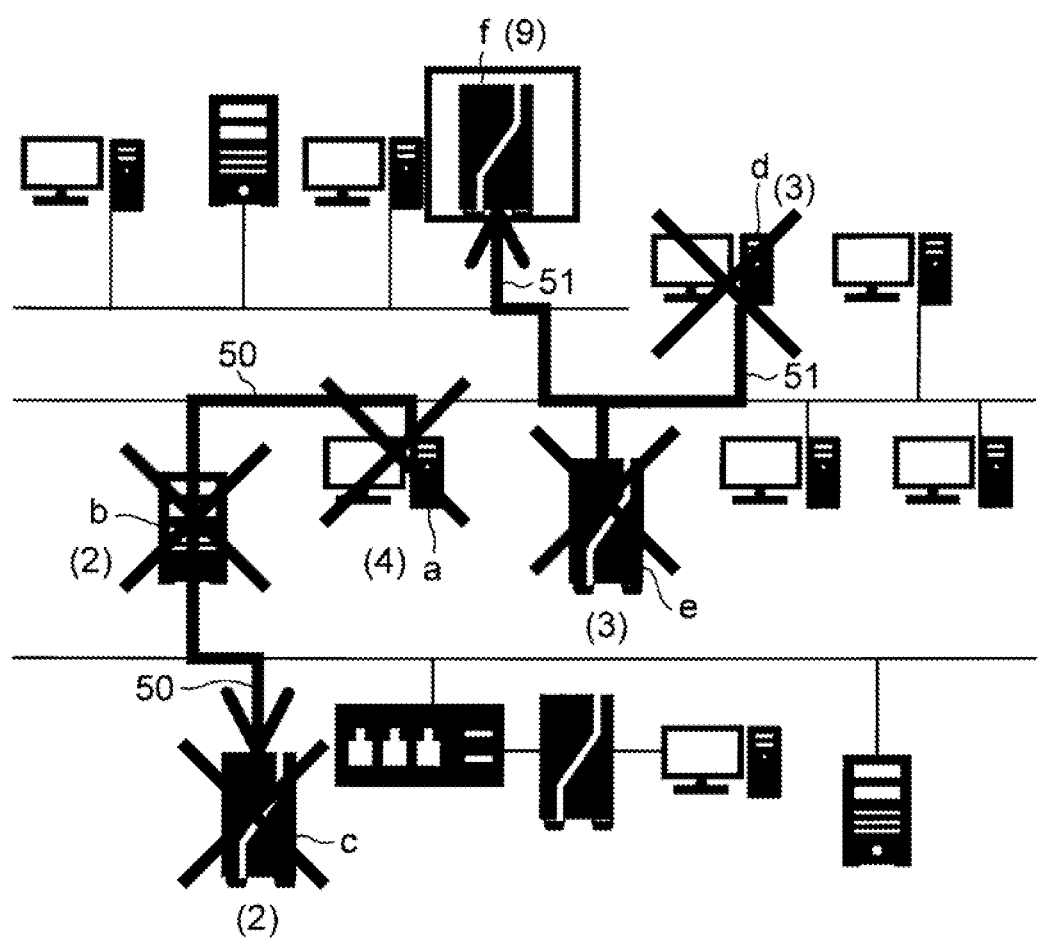
FIG. 7 It is a schematic diagram indicating an example of how the display changes with the passage of time.
Figure 8:
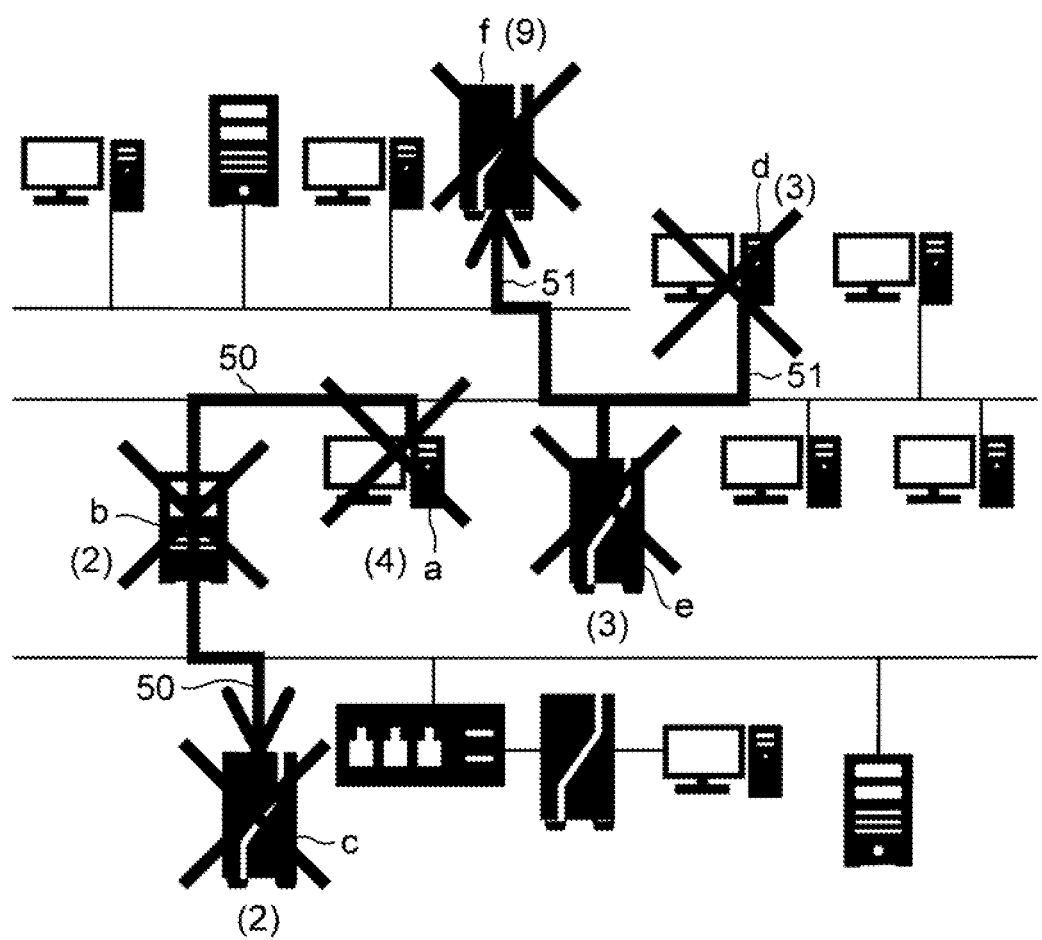
FIG. 8 It is a schematic diagram indicating an example of how the display changes with the passage of time.

FIGS. 6, 7 and 8 are schematic diagrams indicating examples of changes in the display over time. In FIGS. 6, 7, and 8, the attack route "device a→device b→device c" (denoted by the sign "50" and referred to as attack route 50), the attack route "device d→device e→device f" (denoted by the sign "51" and referred to as attack route 51) are used as examples. In FIGS. 6, 7, and 8, the values shown in the vicinity of device a to device f are the time information of each device identified by the time information identification unit 7.

In this example, the time information of the first device a in the attack route 50 is "4". Therefore, the display control unit 8 highlights device a until four seconds after the start of the display. Then, four seconds after the start of the display, the display control unit 8 displays an arrow extending from device a to device b (the second device), superimposes an X mark on device a, and further highlights device b. Since the time information for device b is "2", the display control unit 8 displays the above information for the attack route 50 from the time when 4 seconds have elapsed to the time when 6 seconds have elapsed after the start of the display. Then, six seconds after the start of the display, the display control unit 8 displays an arrow extending from device b to device c (the device at the end point), superimposes an X mark on device b, and also highlights device c. Device c is the endpoint of the attack route 50, and the time information for device c is "2". Therefore, after continuing the display of the attack route 50 for two seconds, the display control unit 8 superimposes an "X" mark on device c.

In this example, the time information of the first device d in the attack route 51 is "3". Therefore, the display control unit 8 highlights device d until three seconds after the start of the display. Then, three seconds after the start of the display, the display control unit 8 displays an arrow extending from device d to device e (the second device), superimposes an X mark on device d, and further highlights device e. Since the time information for device b is "3", the display control unit 8 displays the above information for the attack route 51 from the time when 3 seconds have elapsed to the time when 6 seconds have elapsed after the start of the display. Then, six seconds after the start of the display, the display control unit 8 displays an arrow extending from device e to device f (the device at the end point), superimposes an X mark on device e, and also highlights device f Device f is the endpoint of the attack route 51, and the time information of device f is "9. Therefore, after continuing the display of the attack route 51 for 9 seconds, the display control unit 8 superimposes the "X" mark on device f.

FIG. 6 indicates the display state after 5 seconds have elapsed from the start of the display in the above example. FIG. 7 indicates the display state after 10 seconds have elapsed from the start of the display in the above example. FIG. 8 indicates the display state after 15 seconds have elapsed from the start of the display in the above example.

As illustrated in FIG. 6, the display control unit 8 displays the devices that have already been successfully attacked by the attacker (devices a and d in FIG. 6), the devices that are in the process of being attacked (devices b and e in FIG. 6), and the devices that will be attacked (devices c and f in FIG. 6), in different ways on each attack route.

The method of displaying that each device on the attack route is being attacked may be any method that allows administrators and others to visually see that the devices are being attacked. Furthermore, the display may be done in such a way that the administrator can visually see how fast the attack on each device will be successful. For example, when displaying a device that is under attack, the display control unit 8 may change the display of the device within a time period corresponding to the time information of the device. For example, suppose the time information of the device under attack is "5". In that case, the display control unit 8 may gradually change the color of the device from its initial color during the 5 seconds. Alternatively, the display control unit 8 may change the shade of the color of the device during the 5 seconds, or may change the display so that a different color from the initial state spreads from the bottom of the device displayed on the screen upward. The display control unit 8 may also display a gauge indicating the progress of the attack on each device, and change the display of the gauge at a rate corresponding to the time information of the device. The exemplified display method allows the administrator to easily grasp how fast the system to be diagnosed will be affected by the attack, and furthermore, the speed of the attack on each device can be easily grasped.

The above example shows a case where the display control unit 8 changes the display as if one second in the time elapsed when displaying each attack route corresponds to the value "1" in the time information. The display control unit 8 may change the speed of the display according to the designated parameter, which is designated via the user interface (not shown). In this case, the display can be changed in the same manner as so-called fast forward or slow playback. The same applies to the other display examples described below.

Figure 9:
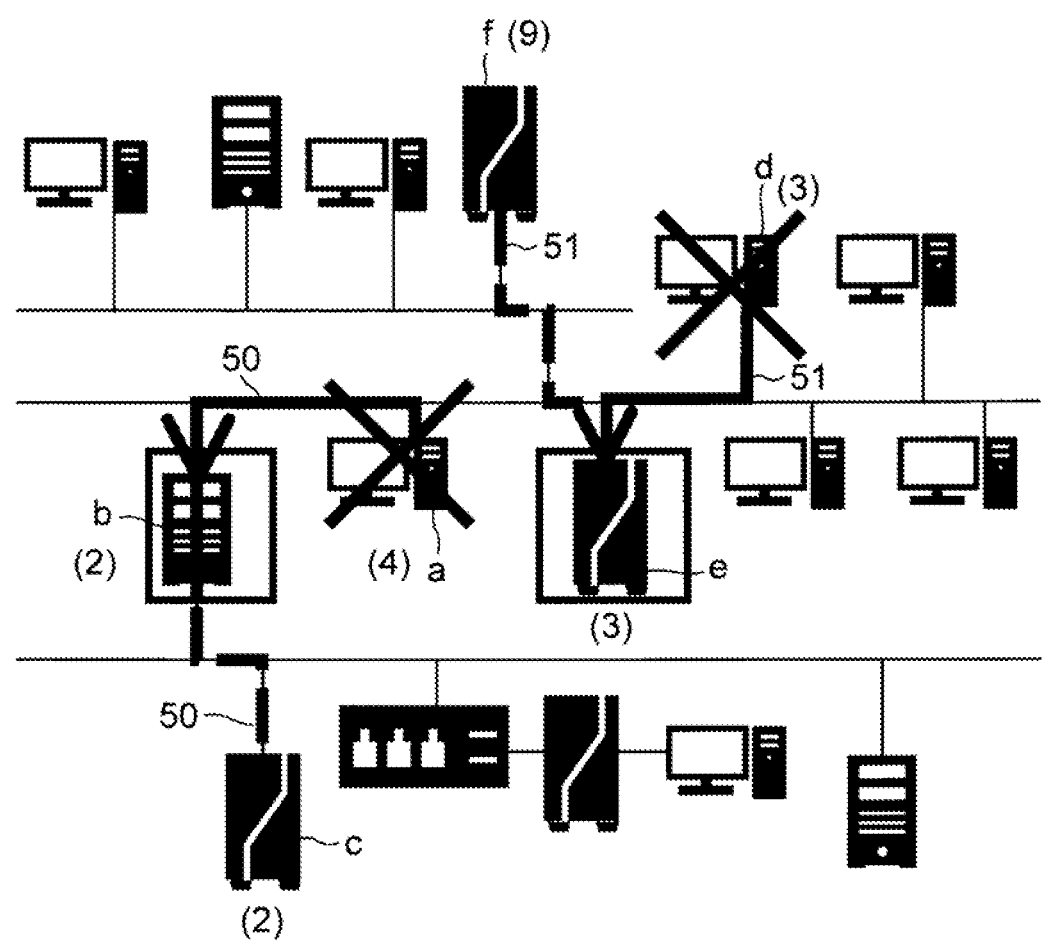
FIG. 9 It is a schematic diagram indicating an example of a display when displaying the section where the arrow will extend from now on with as a dotted line.

In each attack route, the display control unit 8 may display each attack route by changing the display style of the section up to the point where the arrow extends and the section where the arrow will extend. For example, the display control unit 8 may display the section of each attack route up to the point where the arrow extends as a solid line, and the section where the arrow will extend as a dotted line. An example of this display method applied to FIG. 6 is shown in FIG. 9. By displaying the data in this way, the administrator can understand along what route the attack is spreading. The same applies to the other display examples described below.

The display control unit 8 may also display the degree of spread of the attack at a point in time designated by the administrator. For example, the display control unit 8 accepts the designation of a time information value via a user interface (not shown). Then, the display control unit 8 may display on the display device 9 the image at the time when the time corresponding to the value of the time information has elapsed since the start of the display. For example, if "5" is designated as the time information, the display control unit 8 displays the state shown in FIG. 6 (the state after 5 seconds has passed). If "10" is designated as the time information, the state shown in FIG. 7 (the state after 10 second has passed) may be displayed. If "15" is designated as the time information, the state shown in FIG. 8 (the state after 15 second has passed) may be displayed. This is the same for the other display examples described below.

Instead of continuously changing the display, the display control unit 8 may switch the display indicating the degree of spread of the attack at a time interval designated by the administrator. For example, the display control unit 8 accepts the designation of the value of the time information via a user interface (not shown). Then, the display control unit 8 may switch the display at a time interval corresponding to the value. For example, suppose that "5" is designated as the value. In this case, the display control unit 8 can switch the display in the order shown in FIG. 6 (display of the status after 5 seconds have elapsed), FIG. 7 (display of the status after 10 seconds have elapsed), and FIG. 8 (display of the status after 15 seconds have elapsed). This is the same for the other display examples described below.

Next, other display examples by the display control unit 8 is explained. In the example shown below, the display control unit 8 uses arrows along each attack route to indicate how far the attack along the route has progressed. In other words, the display control unit 8 indicates how far the attacks along the attack routes have progressed by displaying the arrows so that the arrows extend.

Using an attack along a single attack route as an example, the example will be explained more specifically where the display control unit 8 displays an arrow extending along that attack route. The display control unit 8 starts to display the arrow from the first device to the second device on the attack route after the time corresponding to the time information of the first device on the attack route has elapsed. The fact that the arrow from the first device to the second device has not yet been displayed schematically indicates that the attack on the first device has not yet been successful. And the fact that the time corresponding to the time information of the first device has elapsed means that the attacker has successfully attacked the first device. In addition, the display control unit 8 displays the information in such a way that the arrow gradually extends from the i-th device to the i+1st device in the time corresponding to the value of the time information of the i+1st device on the attack route, from the time when the time corresponding to the accumulated value of the time information of each device up to the i-th device on the attack route (i is an integer greater than or equal to 1) has elapsed. In other words, in this example, the speed at which the arrow extends indicates the speed at which an attack on the next device will be successful. The display of the arrow extending from the i-th device to the i+1st device schematically indicates that an attack on the i+1st device is in progress.

The display control unit 8 displays arrows along each attack route, assuming that the attack on the first device of each attack route starts at the same time.

As in the previous example, in this example, for the sake of simplicity, it is assumed that one second in the time elapsed when the arrow is displayed corresponds to the value "1" in the time information.

Figure 10:
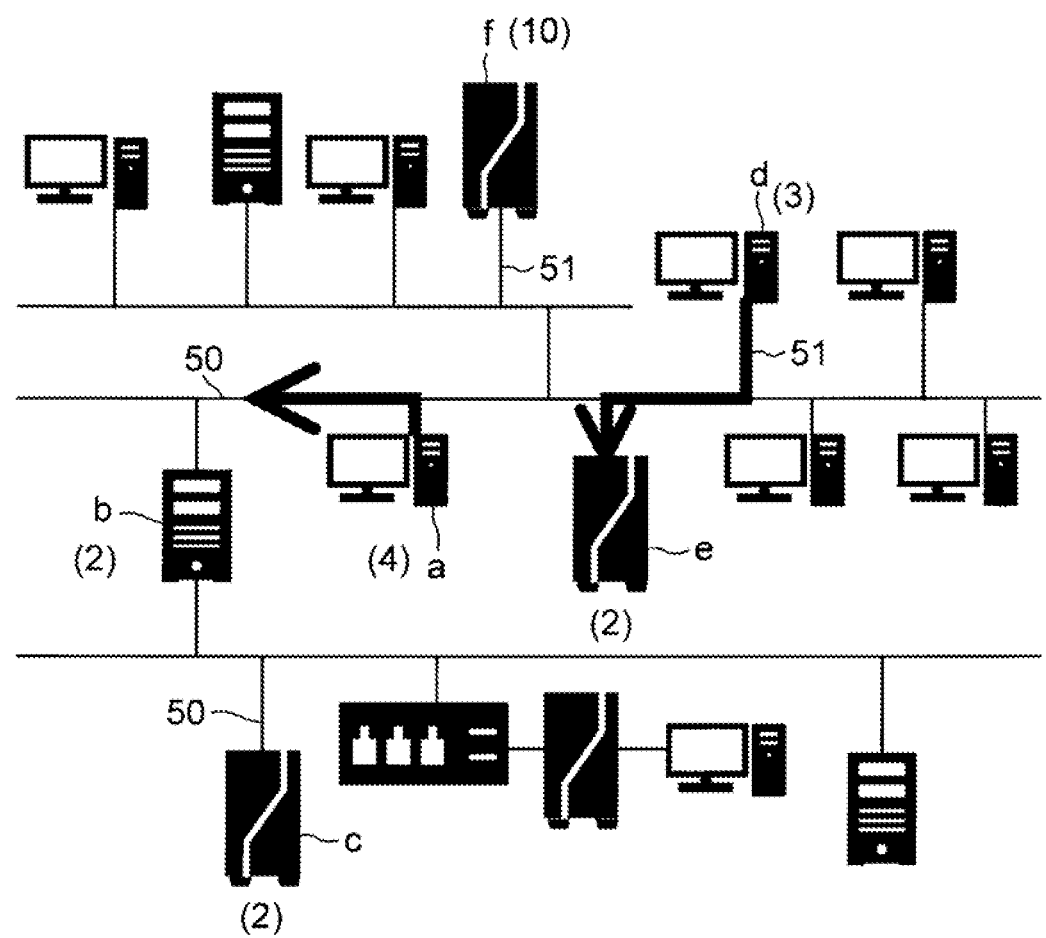
FIG. 10 It is a schematic diagram indicating an example of how the display changes with the passage of time.
Figure 11:
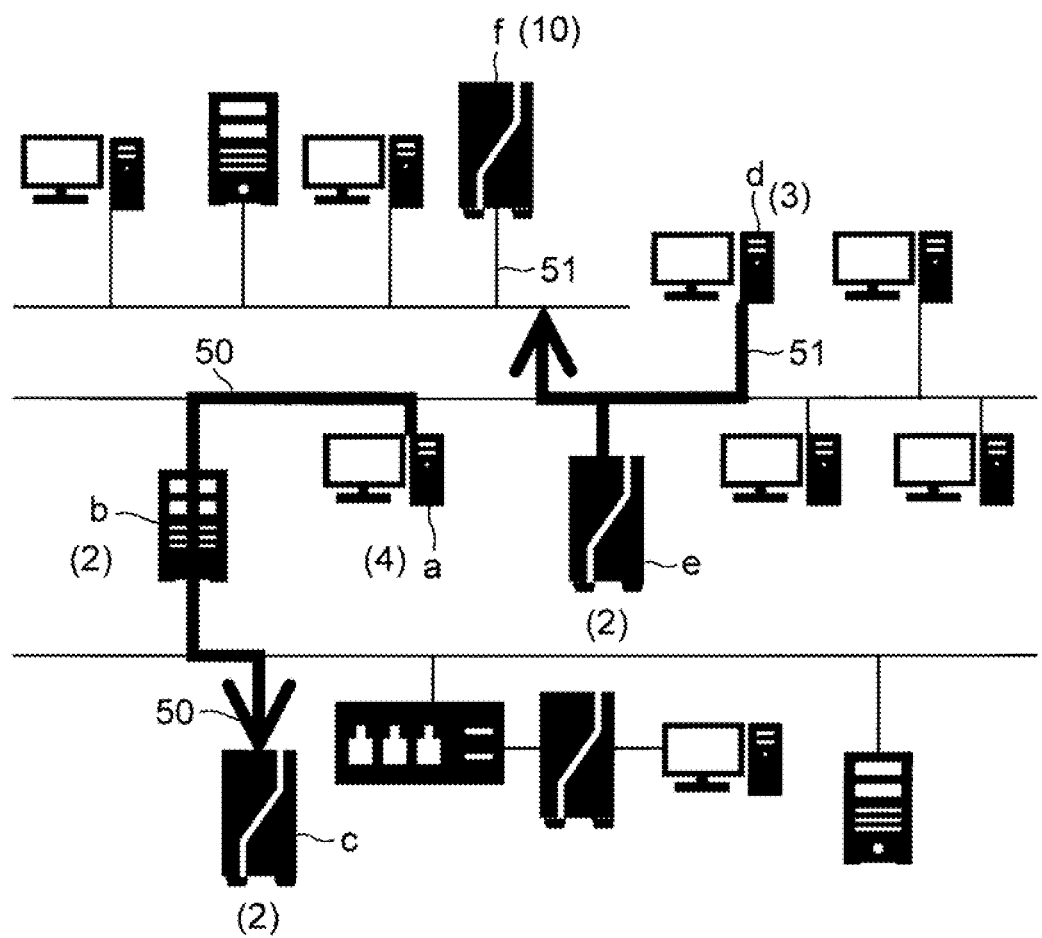
FIG. 11 It is a schematic diagram indicating an example of how the display changes with the passage of time.
Figure 12:
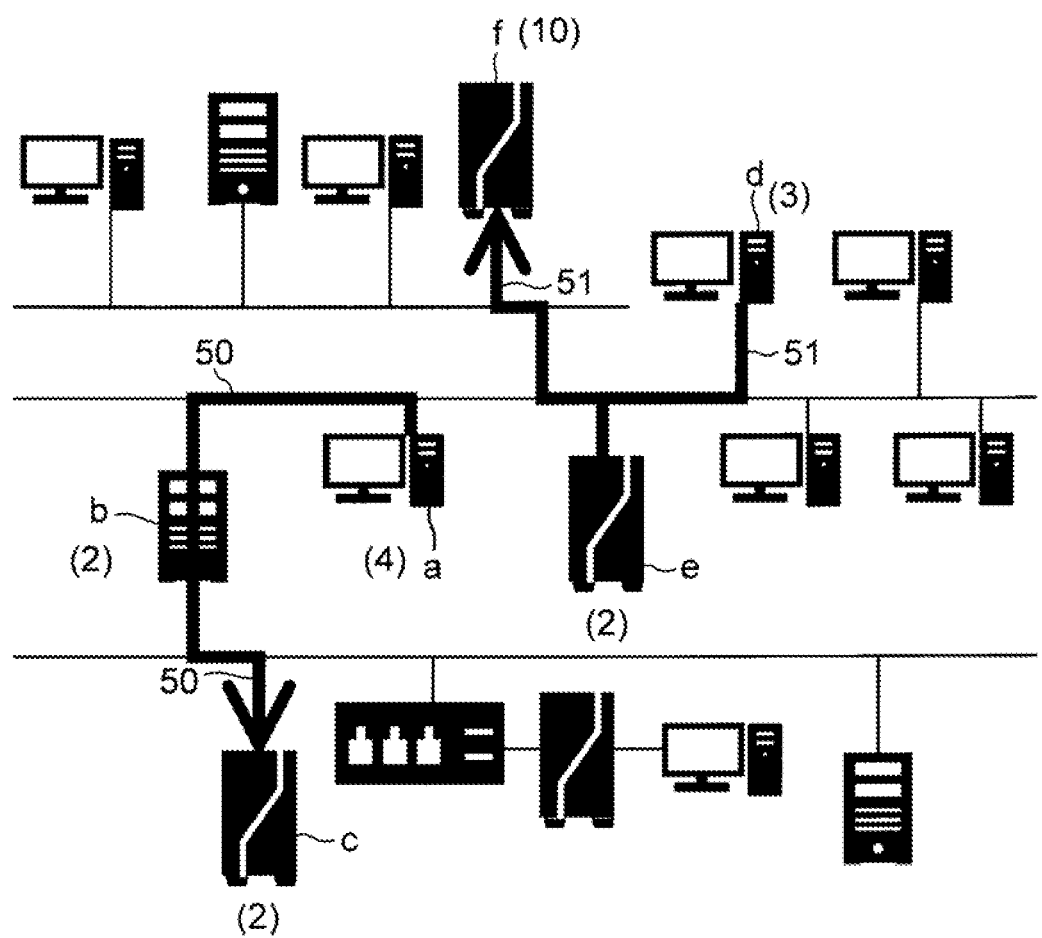
FIG. 12 It is a schematic diagram indicating an example of how the display changes with the passage of time.

Specific examples of the display by the display control unit 8 will be explained with reference to the drawings. FIGS. 10, 11, and 12 are schematic diagrams indicating examples of changes in the display over time. In FIGS. 10, 11 and 12, the attack route 50 of "device a→device b→device c" and the attack route 51 of "device d→device e→device f" are used as examples. In FIGS. 10, 11, and 12, the values shown in the vicinity of device a to device f are the time information of each device identified by the time information identification unit 7. In the examples shown in FIGS. 10, 11, and 12, the time information of device e is "2" and the time information of device f is "10" for the sake of simplicity. The time information for device a to device d is the same as in the examples shown in FIGS. 6, 7, and 8.

The time information of the first device a in the attack route 50 is "4". Therefore, the display control unit 8 starts to display the arrow extending from device a to device b four seconds after the start of the display. Here, the time information for device b is "2", so the display control unit 8 displays the arrow extending from device a to device b within 2 seconds. Furthermore, since the time information for device c is also "2", the display control unit 8 displays an arrow so that the arrow extends from device b to device c within two seconds.

The time information of the first device d in the attack route 51 is "3". Therefore, the display control unit 8 starts to display the arrow extending from device d to device e three seconds after the start of the display. Here, since the time information for device e is "2", the display control unit 8 displays an arrow extending from device d to device e within 2 seconds. Furthermore, the time information for device f is "10", so the display control unit 8 displays the arrow so that the arrow extends from device e to device f within 10 seconds.

FIG. 10 shows the display state 5 seconds after the start of the display, when the display control unit 8 displays each arrow corresponding to the attack routes 50 and 51 as described above. FIG. 11 shows the display state after 10 seconds have elapsed from the start of display. FIG. 12 shows the display state after 15 seconds have elapsed from the start of display. By checking these displays on the display device 9, the administrator can easily determine that the attack along the attack route 50 will take less time to successfully attack the endpoint device. This makes it easy for the administrator to determine which attack route should be prioritized for action.

The time information identification unit 7 may calculate the sum of the values of the time information of each device on the attack route for each attack route. The display control unit 8 may then display the sum of the values of the time information of each device on the attack route calculated by the time information identification unit 7 in the vicinity of the device that is the endpoint of each attack route. This sum is the time it takes to successfully attack the device that is the endpoint of the attack route. Therefore, this display allows the administrator to compare the time until the successful attack on the endpoint device of each attack route. The display of the time to successfully attack the endpoint device for each attack route can also be applied to the displays illustrated in FIGS. 6, 7, and 8.

The above example shows a case where the display control unit 8 displays the arrows in such a way that the arrows gradually extend. The display control unit 8 may display the arrows in such a way that the arrow leading to the i-th device is switched to the arrow leading to the i+1st device at the timing of a successful attack on the i+1st device on the respective attack route.

The time information is not limited to values, but labels such as "long time", "medium time", "short time", etc. may be used as time information. In this case, the display control unit 8 replaces the labels such as "long time," "medium time," and "short time" identified for each device with, for example, "10," "5," "2", etc., and display as in each of the aforementioned examples.

The display device 9 is a device that displays information, and can be a general display device. If the analysis system 1 exists in the cloud, the display device 7 may be a display device of a terminal connected to the cloud.

The data collection unit 2 is realized, for example, by a CPU (Central Processing Unit) of a computer that operates according to an analysis program and a communication interface of the computer. For example, the CPU may read the analysis program from a program recording medium such as a program storage device of the computer, and operate as the data collection unit 2 according to the program and using the communication interface of the computer. The topology identification unit 4, the detection unit 5, the time information identification unit 7, and the display control unit 8 are realized, for example, by the CPU of the computer operating according to the analysis program. For example, the CPU may read the analysis program from the program recording medium as described above and operate as the topology identification unit 4, detection unit 5, time information identification unit 7, and display control unit 8 according to the program. The data storage unit 3 and the time information storage unit 6 are realized, for example, by a storage device included in the computer.

Figure 13:
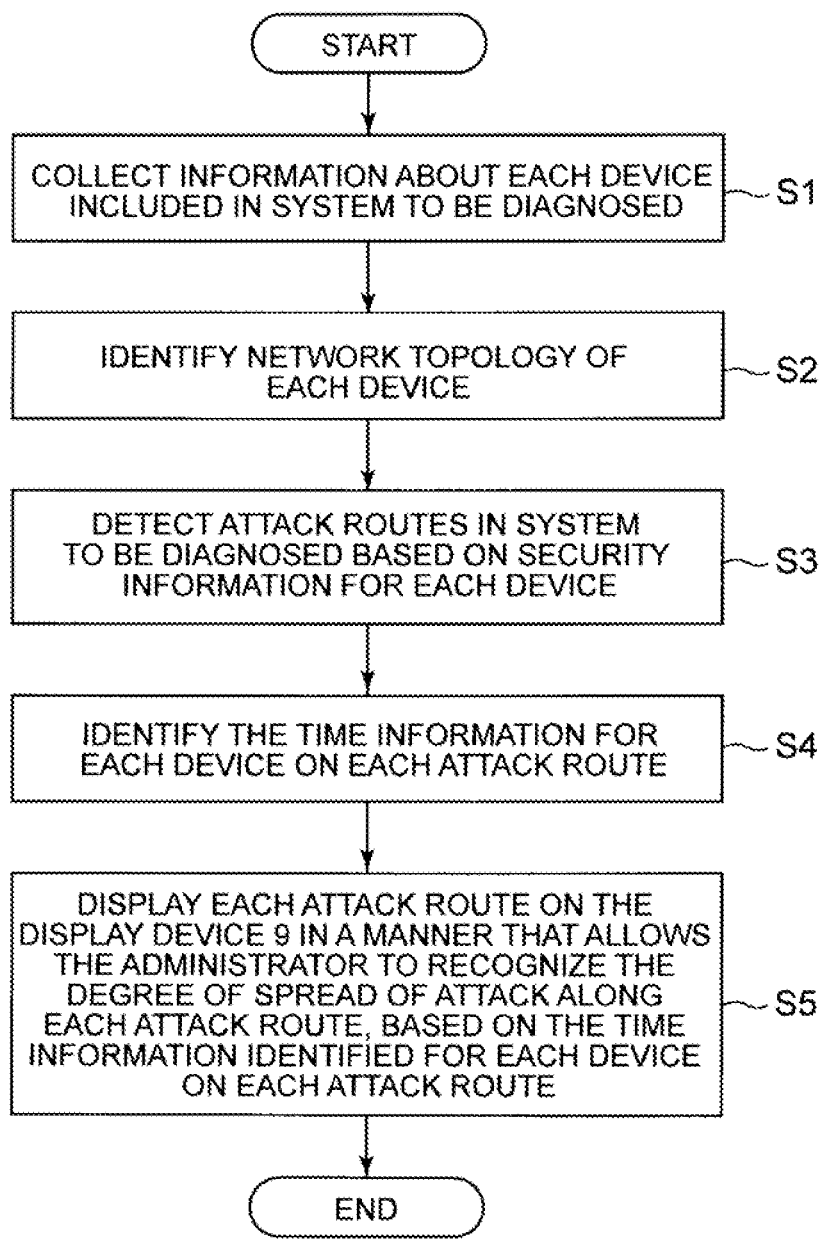
FIG. 13 It is a flowchart depicting an example of the processing process of the analysis system of the first example embodiment.

Next, the processing process will be explained. FIG. 13 is a flowchart depicting an example of the processing process of the analysis system 1 of the first example embodiment. The matters already explained are omitted.

First, the data collection unit 2 collects information about each device included in the system to be diagnosed (Step S1). The data collection unit 2 stores the collected information in the data storage unit 3.

Next, the topology identification unit 4 identifies the network topology of each device (Step S2).

Next, the detection unit 5 detects the attack routes in the system to be diagnosed based on the security information for each device (Step S3).

Next, the time information identification unit 7 identifies the time information for each device on each attack route (Step S4).

Next, the display control unit 8 displays each attack route superimposed on the network topology. At this time, the display control unit 8 displays each attack route on the display device 9 in a manner that allows the administrator to recognize the degree of spread of attack along each attack route, based on the time information identified for each device on each attack route (Step S5). The display control unit 8 may display the attack routes in the manner illustrated in FIGS. 6, 7, and 8. Alternatively, the display control unit 8 may display the attack routes in the manner illustrated in FIGS. 10, 11, and 12.

According to this example embodiment, as described above, the display control unit 8 displays each attack route on the display device 9 in a manner that allows the administrator to recognize the degree of spread of the attack along each attack route. Thus, the administrator can check the status of the attack spreading to each device along each attack route. Therefore, it is easy to determine which attack route should be prioritized for action. For example, the attack route that has the shortest time to successfully attack the device that corresponds to the endpoint can be identified, and a decision can be easily made to give priority to that attack route.

In this way, it is possible to analyze how the impact of an attack spreads.

The analysis system 1 may display one attack route in a manner different from other attack routes (e.g., a different thickness, color, or line type from other attack routes) depending on the time until the successful attack on the device corresponding to the endpoint. For example, the analysis system 1 may identify the attack route that has the shortest time until the successful attack on the device corresponding to the endpoint, and display that attack route in a manner different from other attack routes. Specifically, the time information identifying unit 7 may calculate the sum of the values of the time information of each device on the attack route for each attack route, and determine the attack route with the smallest sum of the values of the time information as the attack route with the shortest time until the successful attack on the device corresponding to the end point. Then, the display control unit 8 may display that attack route in a manner different from the other attack routes. This point is also true for the variation of the first example embodiment described next and the second example embodiment described later.

Next, a variation of the first example embodiment will be explained. The above description illustrates a case in which the display control unit 8 indicates how far the attack along each attack route has progressed by highlighting the device being attacked (see FIGS. 6, 7 and 8) or by extending the arrows according to the degree of spread of the attack (see FIGS. 10, 11 and 12).

In this variation, when displaying each attack route on the display device 9, the display control unit 8 may display the attack route, by displaying sections between the devices in a manner according to the ratio indicated by the time information of each device to the sum of the time information of each device that exists on the attack route, on the attack route from the device that is the starting point of the attack to the device that is the end point of the attack. Alternatively, for each attack route, the display control unit 8 may display the section from the device one device before the respective device on the attack route to the respective device on the display device 9 in a manner (e.g., color, thickness, line type, etc.) corresponding to the time information of the respective device. In other words, for each attack route, the display control unit 8 may display the section from the i-th (i is an integer greater than or equal to 1) device to the i+1st device on the attack route on the display device 9 in a color, thickness, line type, etc. according to the time information of the i+1st device.

Figure 14:
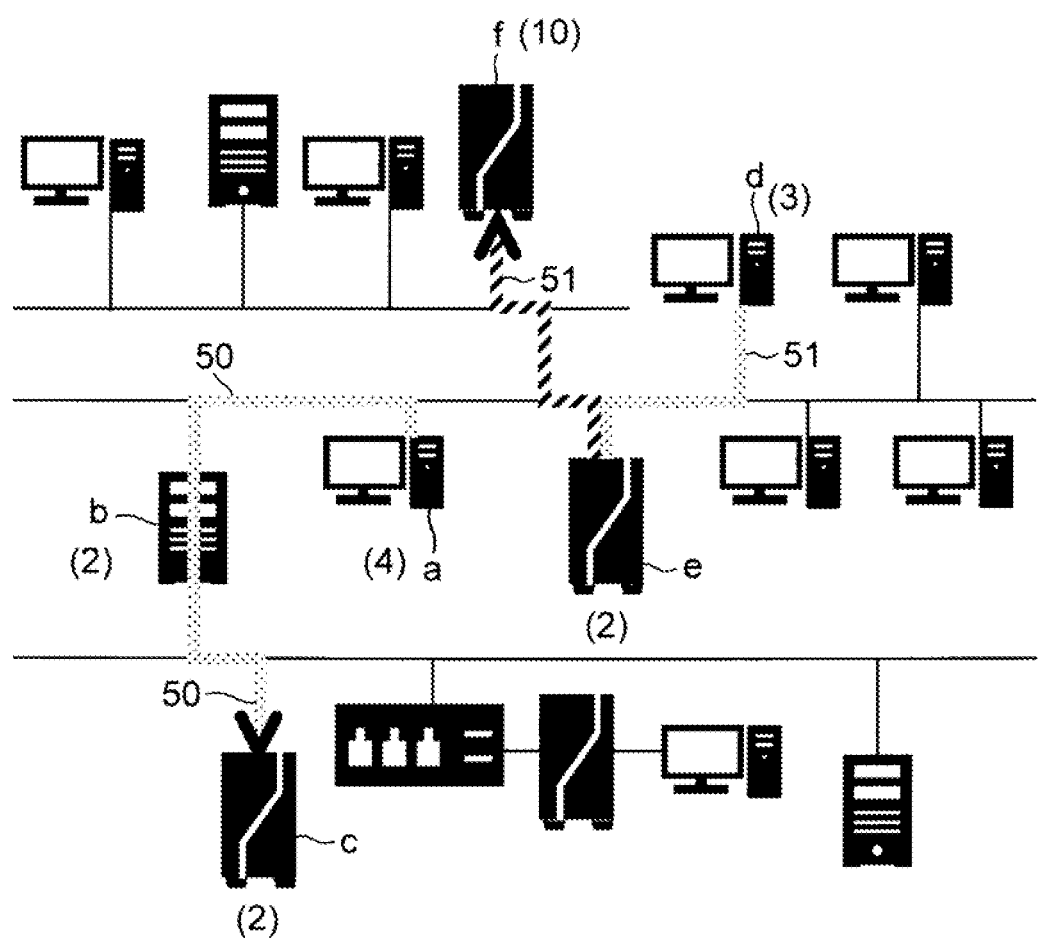
FIG. 14 It is a schematic diagram indicating an example of the display of each attack route in a variation of the first example embodiment.

FIG. 14 is a schematic diagram indicating an example of the display of each attack route in a variation of the first example embodiment. In the example shown in FIG. 14, the time information for device e, device b, and device c are all "2". Therefore, the sections from device d to device e, from device a to device b, and from device b to device c are displayed in the same color. The time information for device f is "10", so the section from device e to device f is displayed in a different color from the above three sections.

In this kind of display, the administrator can also check the degree of spread for each attack route. Therefore, it is easy to determine which attack route should be prioritized.

When displaying each attack route, the display control unit 8 may display each device on each attack route in a manner corresponding to the time information of the device.

For example, the display control unit 8 may display devices with large time information values in red, and devices with small time information values in blue. However, the above colors of red, blue, etc. are only examples. With this kind of display, the administrator can check the durability of each device as well as the degree of spread of the attack, and can easily determine which attack route should be prioritized.

This variation can also be applied to the second example embodiment described below.

Example Embodiment 2

FIG. 15 is a block diagram of an example of the analysis system of the second example embodiment of the present invention. Elements similar to those of the first example embodiment are indicated with the same sign as in FIG. 1. The analysis system 1 of the second example embodiment includes a data collection unit 2, a data storage unit 3, a topology identification unit 4, a detection unit 5, a time information storage unit 6, a time information identification unit 7, a damage information storage unit 11, a damage identification unit 12, a display control unit 8, and a display device 9.

The data collection unit 2, the data storage unit 3, the topology identification unit 4, the detection unit 5, the time information storage unit 6, the time information identification unit 7, and the display device 9 are the same as those elements in the first example embodiment, and the explanations are omitted.

The damage information storage unit 11 is a storage device that stores damage information (information that indicates the content of damage suffered when attacked) according to the function of the device and the type of attack.

FIG. 16 is a schematic diagram depicting an example of information stored in the damage information storage unit 11. For example, the damage information storage unit 11 stores a table that associates the function of the device, the attack type, and the damage information, as illustrated in FIG. 16. The attack type can be identified based on the function of the device. The damage information can be identified based on both the function of the device and the attack type, or one of them. For example, the information exemplified in FIG. 16 can be predetermined by the administrator and stored in the damage information storage unit 11.

The damage identification unit 12 identifies the damage information for each device on the attack route. The damage identification unit 12 performs this process for each attack route. However, there may be devices on the attack route for which no damage information is identified.

The following is an example of how the damage identification unit 12 identifies damage information for each device of one attack route. The damage identification unit 12 identifies the function of the device and the attack type for each device of the attack route of interest.

The damage identification unit 12, for example, identifies the function of each device as follows.

The conditions according to the function of the device are defined in advance.

For example, an account server is equipped with software for account servers. The account server also transfers communication data to and from other devices using a predetermined protocol. In addition, for example, the account server has a predetermined port open. Therefore, for example, for the "account server function", one, two or more of the following conditions are predetermined: "software for the account server is installed", "the device exchanges communication data with other devices using a predetermined protocol", or "a predetermined port is open".

For example, for the "human resources information management server function", the condition that "software for the human resources information management server is installed" is predetermined.

The damage identification unit 12 may identify the function of the device by referring to the information about the device whose function is to be identified and determining whether the information satisfies the conditions corresponding to any function. If the information about the device does not meet the conditions for any of the functions, the damage identification unit 12 may derive the result "No applicable function" as the function of the device.

Using the method described above, the damage identification unit 12 identifies the function of each device on the attack route of interest.

Also, as mentioned earlier, the attack type can be identified based on the function of the device. Therefore, for example, the damage identification unit 12 can identify the attack type based on the correspondence between the function of the device and the attack type, which is known in advance.

However, the damage identification unit 12 may identify the functions of devices in other ways. For example, the damage identification unit 12 may identify the function of each device on the attack route by receiving the designation of the function of each device from the administrator via a user interface (not shown). The same applies to the attack type.

After the damage identification unit 12 has identified the function of the device and attack type for one device on the attack route of interest, the damage identification unit 12 identifies the damage information corresponding to the combination of the function of the device and attack type, for example, by referring to the table (see FIG. 16) stored by the damage information storage unit 11. The damage information can also be identified from one of the function of the device and attack type. Therefore, the damage identification unit 12 may identify damage information corresponding to the function of the device or to the attack type. If the damage information corresponding to the combination of the function of the device and the attack type, or either of them, cannot be identified by referring to the table stored by the damage information storage unit 11 (see FIG. 16), the damage identification unit 12 determines that there is no damage information for the device. The damage identification unit 12 performs this operation for each device on the attack route of interest. As a result, the damage information for each device on the attack route of interest is determined.

The damage identification unit 12 performs the same operation as above for each attack route, and identifies damage information for each device on each attack route. However, as mentioned above, there may be devices for which no damage information is identified.

In the above explanation, a case, where the damage identification unit 12 determines the damage information based on the function of the device and the attack type, has been shown. The damage identification unit 12 may define the damage information in other ways. For example, it is possible to associate the vulnerability type to the damage information in advance. The damage identification unit 12 may identify the vulnerability type based on the software installed on each device on each attack route, and identify the damage information based on the vulnerability type.

The damage identification unit 12 performs the above process, for example, following step S4 (see FIG. 13) in the first example embodiment.

Then, in step S5 (see FIG. 13), the display control unit 8 displays each attack route as described in the first example embodiment or a variation of the first example embodiment, and also displays damage information (i.e., information that indicates the content of damage suffered when attacked) in the vicinity of the device for which the damage information was identified.

Figure 17:
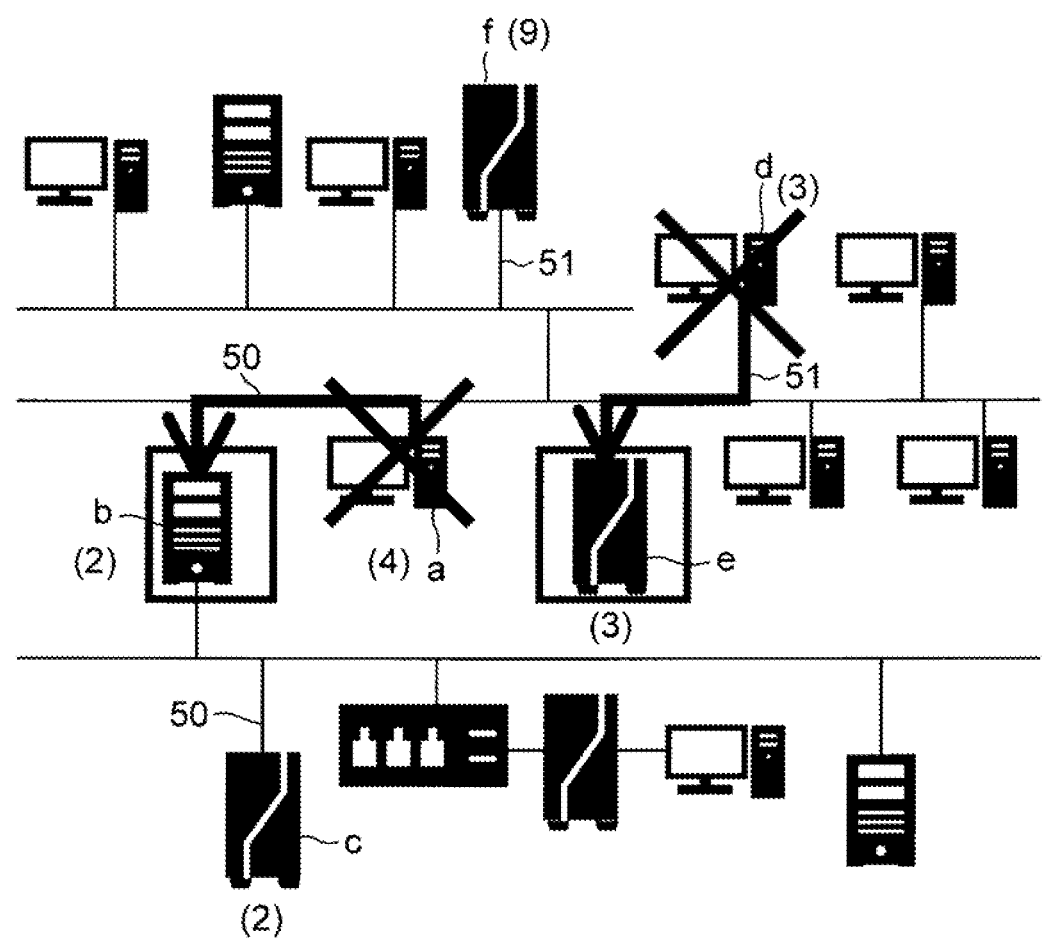
FIG. 17 It is a schematic diagram indicating an example of how the display changes with the passage of time in the second example embodiment.
Figure 18:
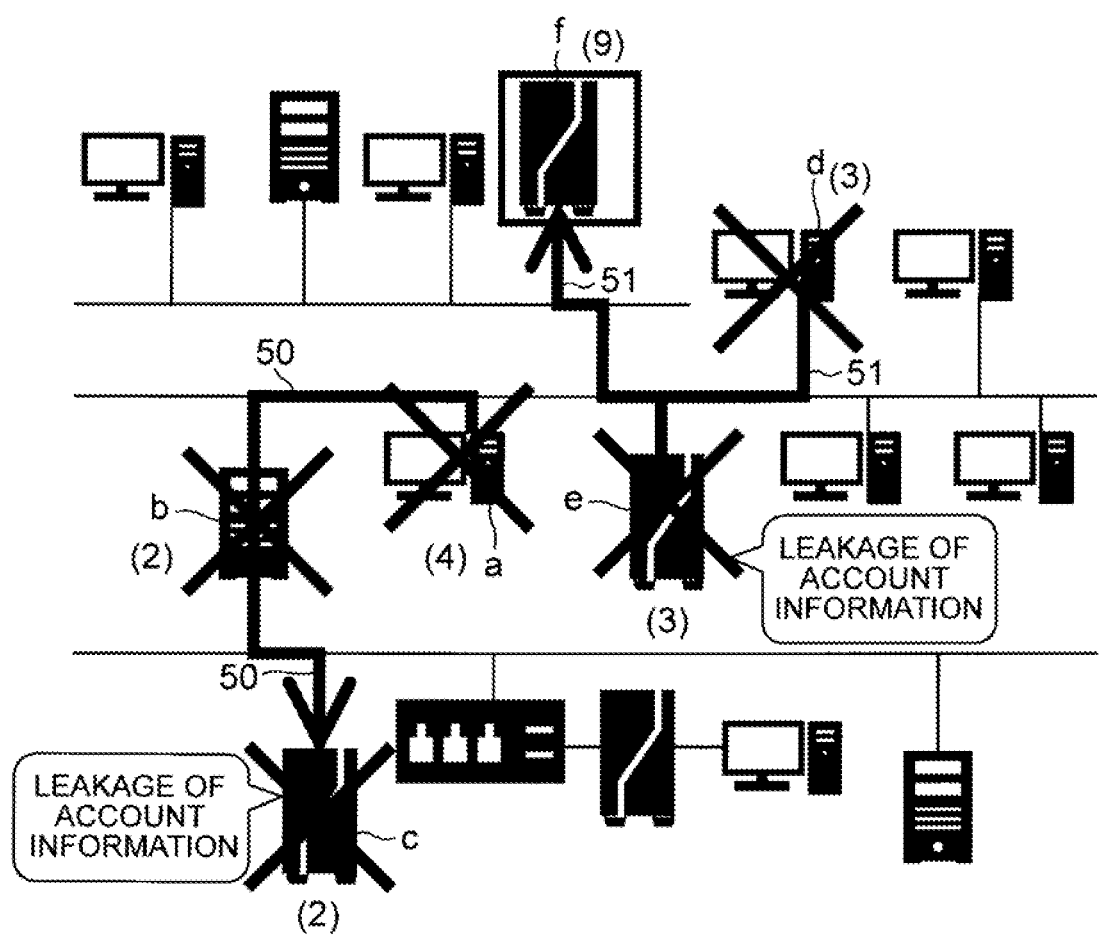
FIG. 18 It is a schematic diagram indicating an example of how the display changes with the passage of time in the second example embodiment.
Figure 19:
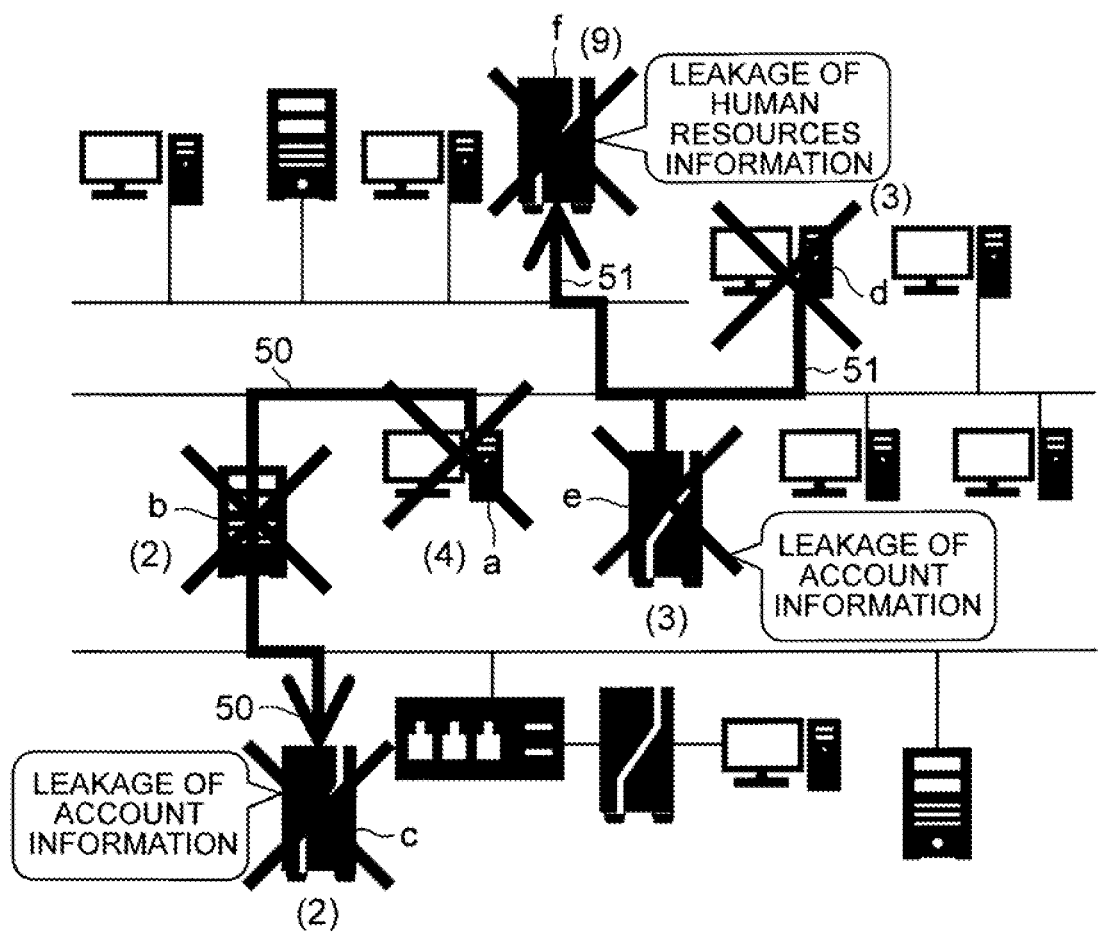
FIG. 19 It is a schematic diagram indicating an example of how the display changes with the passage of time in the second example embodiment.

In the second example embodiment, suppose that the display control unit 8 displays the degree of spread of the attack by highlighting the device under attack, as illustrated in FIGS. 6, 7, and 8. In this case, damage information (i.e., information that indicates the content of damage suffered when attacked) may be displayed in the vicinity of the device at the time the attack on the device is successful. Examples of such displays are shown in FIGS. 17, 18, and 19. In the examples shown in FIGS. 17 to 19, it is assumed that damage information has been identified for devices e, c, and f as illustrated in the first example embodiment. As in FIG. 6, FIG. 17 shows the display state 5 seconds after the start of the display. At this point, the attack has not yet succeeded on any of the devices e, c, and f Therefore, as shown in FIG. 17, no damage information is displayed yet. FIG. 18 shows the display state 10 seconds after the start of the display, as in FIG. 7. At this point, the attack on devices e and c has been successful. Therefore, the display control unit 8 displays the damage information in the vicinity of device e and device c respectively, as illustrated in FIG. 18. FIG. 19 shows the display state 15 seconds after the start of the display, as in FIG. 8. At this point, the attacks on devices e, c, and f have been successful. Therefore, the display control unit 8 displays the damage information in the vicinity of device e, device c, and device f, respectively, as illustrated in FIG. 19.

When displaying the entirety of each attack path as in the variation of the first example embodiment, the display control unit 8 may display the damage information in the vicinity of the device for which the damage information was identified.

The display control unit 8 may change the size and color of the text and pop-ups according to the magnitude of the damage content indicated by the damage information. For example, the content of the damage information may be ranked in advance, and the display control unit 8 may set the size and color of the text and pop-ups according to the rank when displaying the damage information.

The display format of damage information is not limited to the above example. For example, the display control unit 8 may display an icon near the device for which damage information has been identified, indicating that damage information is related to that device.

When the icon is clicked by a mouse and the like, the display control unit 8 may display the damage information about the device. Alternatively, the display control unit 8 may display damage information about the device when the icon is in mouse-over state (rollover). The display control unit 8 may also display damage information in a pop-up window and change the size of the pop-up window according to the operation by the mouse and the like.

The damage identification unit 12 is realized, for example, by the CPU of the computer that operates according to the analysis program. For example, the CPU may read the analysis program from the program recording medium and operate as the damage identification unit 12 according to the program. The damage information storage unit 11 is realized, for example, by a storage device included in the computer.

The second example embodiment has the same effect as the first example embodiment. In the second example embodiment, the display control unit 8 also displays damage information near the device on the display device 9, which indicates the damage to be suffered if the device on the attack route is attacked. Therefore, the administrator can determine which attack route should be dealt with in priority according to the assumed damage.

Figure 20:
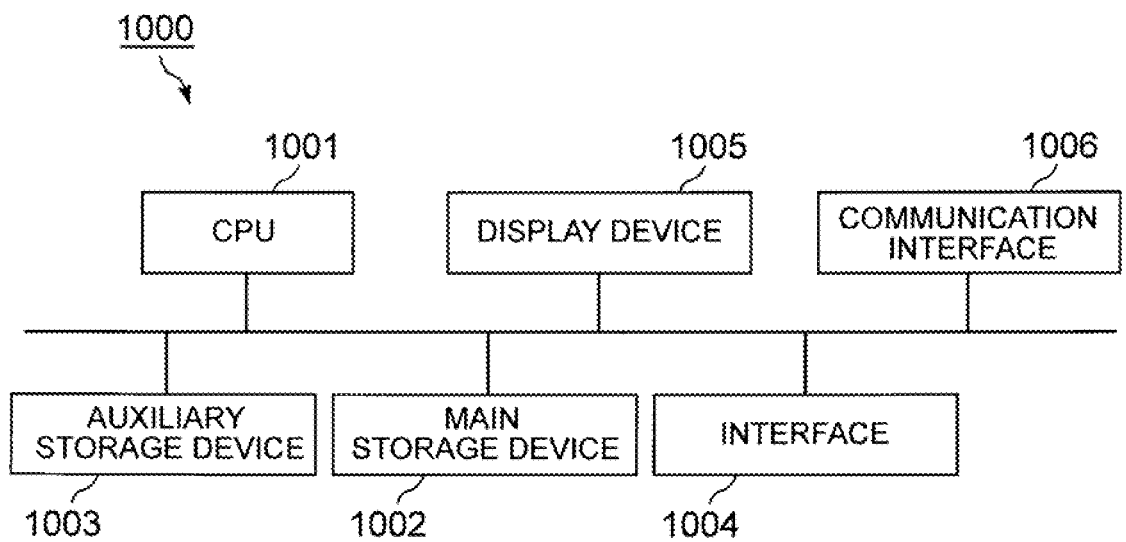
FIG. 20 It is a schematic block diagram of a computer configuration for the analysis system of each example embodiment of the present invention.

FIG. 20 is a schematic block diagram of a computer configuration for the analysis system 1 of each example embodiment of the present invention. The computer 1000 includes a CPU 1001, a main storage device 1002, an auxiliary storage device 1003, an interface 1004, a display device 1005, and a communication interface 1006.

The analysis system 1 of each example embodiment of the present invention is realized by a computer 1000. The operation of the analysis system 1 is stored in the auxiliary storage device 1003 in the form of an analysis program. The CPU 1001 reads the analysis program from the auxiliary storage device 1003, expands it to the main storage device 1002, and executes the processing described in each of the above example embodiments according to the analysis program.

The auxiliary storage device 1003 is an example of a non-transitory tangible medium. Other examples of non-transitory tangible media include a magnetic disk, a magneto-optical disk, CD-ROM (Compact Disk Read Only Memory), DVD-ROM (Digital Versatile Disk Read Only Memory), semiconductor memory, and the like, which are connected via an interface 1004. When the program is delivered to the computer 1000 via a communication line, the computer 1000 receiving the delivery may expand the program into the main memory device 1002 and execute the processing described in each of the above example embodiments according to the program.

Some or all of the components may be realized by general-purpose or dedicated circuitry, processors, or a combination of these. They may be configured with a single chip, or configured with the plurality of chips connected via a bus. Some or all of each component may be realized by a combination of the above-mentioned circuitry, etc. and programs.

When some or all of each component is realized by the plurality of information processing devices, circuitry, etc., the plurality of information processing devices, circuitry, etc.

may be centrally located or distributed. For example, the information processing devices, circuitry, etc. may be implemented as a client-and-server system, cloud computing system, etc., each of which is connected via a communication network.

Figure 21:
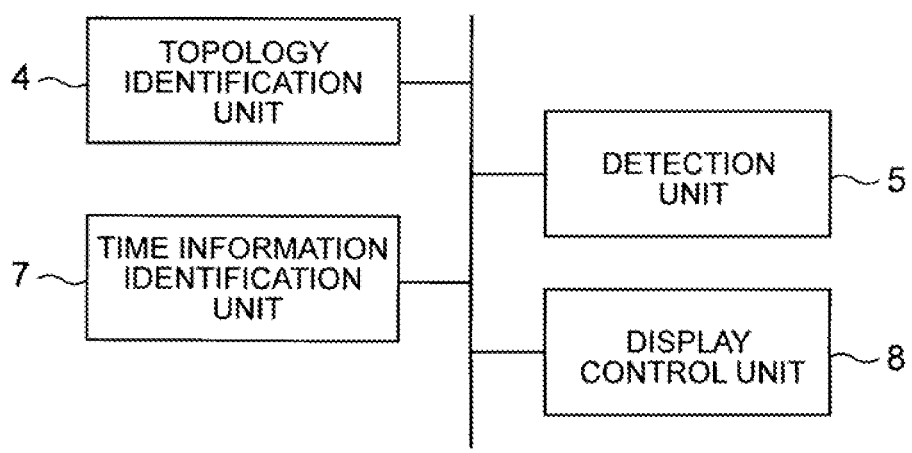
FIG. 21 It is a block diagram depicting an overview of an analysis system according to the present invention.

Next, an overview of the present invention will be described. FIG. 21 is a block diagram depicting an overview of an analysis system according to the present invention. The analysis system of the present invention includes a topology identification unit 4, a detection unit 5, a time information identification unit 7, and a display control unit 8.

The topology identification unit 4 identifies a network topology of devices included in a system to be diagnosed.

The detection unit 5 detects attack routes that indicate flows of attacks that can be executed in the system to be diagnosed, based on security information about each device.

The time information identification unit 7 identifies time information that represents degree of time required to attack a device, for each device on each attack route.

The display control unit 8 displays the attack routes on a display device by superimposing the attack routes on the network topology. At this time, the display control unit 8 displays each attack route on the display device in a manner that allows a user to recognize degree of spread of attack along each attack route, based on the time information identified for each device on each attack route.

With such a configuration, it is possible to analyze how the impact of an attack spreads.

The display control unit 8 may be configured to change the display style of each device on each attack route over time, based on the time information of each device on each attack route.

The display control unit 8 may be configured to display in different ways devices on each attack route that have already been successfully attacked by an attacker, devices that are in process of being attacked, and devices that will be attacked, based on the time information of each device on each attack route.

The display control unit 8 may be configured to display each attack route with arrows extending over time to indicate how far attack along each attack route has progressed, based on the time information of each device on each attack route.

The display control unit 8 may be configured to display, for each attack route, section from one device before respective device on the attack route to the respective device on the display device in a manner corresponding to the time information of the respective device.

The system may include a damage identification unit (e.g., damage identification unit 12) that identifies damage information that indicates content of damage of devices on the attack routes when the devices are attacked, and the display control unit 8 may be configured to display the damage information in the vicinity of the devices on the attack routes.

Although the invention of the present application has been described above with reference to example embodiments, the present invention is not limited to the above example embodiments. Various changes can be made to the configuration and details of the present invention that can be understood by those skilled in the art within the scope of the present invention.

This application is based upon and claims the benefit of priority from Japanese patent application No. 2019-063598 filed on Mar. 28, 2019, the disclosure of which is incorporated herein in its entirety by reference.

INDUSTRIAL APPLICABILITY

This invention is suitably applied to analysis systems that display attack routes.

REFERENCE SIGNS LIST

1 Analysis system
2 Data collection unit
3 Data storage unit
4 Topology identification unit
5 Detection unit
6 Time information storage unit
7 Time information identification unit
8 Display control unit
9 Display device
11 Damage information storage unit
12 Damage identification unit

What is claimed is:

1. An analysis system comprising:
a memory configured to store instructions; and
a processor configured to execute the instructions to:
identify a network topology of devices included in a system to be diagnosed;
detect attack routes that indicate flows of attacks that can be executed in the system to be diagnosed, based on security information about each device;
identify time information that represents duration of time required to attack a device, for each device on each attack route; and,
display the attack routes on a display device by superimposing the attack routes on the network topology,
wherein the processor is further configured to display each attack route on the display device in a manner that allows a user to recognize degree of spread of attack along each attack route, based on the time information identified for each device on each attack route,
wherein the processor is further configured to:
identify damage information that indicates content of damage of devices on the attack routes when the devices are attacked, and
display the damage information in the vicinity of the devices on the attack routes.

2. The analysis system according to claim 1,
wherein the processor is further configured to change display style of each device on each attack route over time, based on the time information of each device on each attack route.

3. The analysis system according to claim 1,
wherein the processor is further configured to display different ways devices on each attack route that have already been successfully attacked by an attacker, devices that are in process of being attacked, and devices that will be attacked, based on the time information of each device on each attack route.

4. The analysis system according to claim 1,
wherein the processor is further configured to display each attack route with arrows extending over time to indicate how far attack along each attack route has progressed, based on the time information of each device on each attack route.

5. The analysis system according to claim 1,
wherein the processor is further configured to display, for each attack route, a section from one device before respective device on the attack route to the respective device on the attack route, on the display device, in a manner corresponding to the time information of the respective device.

6. An analysis method, implemented by a computer, the analysis method comprising:
identifying a network topology of devices included in a system to be diagnosed;
detecting attack routes that indicate flows of attacks that can be executed in the system to be diagnosed, based on security information about each device;
identifying time information that represents duration of time required to attack a device, for each device on each attack route; and,
displaying the attack routes on a display device by superimposing the attack routes on the network topology, identifying damage information that indicates content of damage of devices on the attack routes when the devices are attacked, and displaying the damage information in the vicinity of the devices on the attack routes, wherein when displaying the attack routes on a display device the computer displays each attack route on the display device in a manner that allows a user to recognize degree of spread of attack along each attack route, based on the time information identified for each device on each attack route.

7. A non-transitory computer-readable recording medium in which an analysis program is recorded, the analysis program causing a computer to execute:

a topology identification process of identifying a network topology of devices included in a system to be diagnosed;

a detection process of detecting attack routes that indicate flows of attacks that can be executed in the system to be diagnosed, based on security information about each device;

a time information identification process of identifying time information that represents duration of time required to attack a device, for each device on each attack route; and, a display control process of displaying the attack routes on a display device by superimposing the attack routes on the network topology, wherein the analysis program causes the computer to execute, in the display control process, displaying each attack route on the display device in a manner that allows a user to recognize degree of spread of attack along each attack route, based on the time information identified for each device on each attack route, wherein the analysis program causes the computer to execute, identifying damage information that indicates content of damage of devices on the attack routes when the devices are attacked, and in the display control process, displaying the damage information in the vicinity of the devices on the attack routes.

* * * * *